(12) United States Patent
Ono

(10) Patent No.: US 11,574,113 B2
(45) Date of Patent: *Feb. 7, 2023

(54) ELECTRONIC APPARATUS, INFORMATION PROCESSING METHOD, AND RECORDING MEDIUM

(71) Applicant: CASIO COMPUTER CO., LTD., Tokyo (JP)

(72) Inventor: Manato Ono, Wako (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,760

(22) Filed: Sep. 2, 2021

(65) Prior Publication Data

US 2021/0397775 A1 Dec. 23, 2021

Related U.S. Application Data

(63) Continuation of application No. 16/377,653, filed on Apr. 8, 2019, now Pat. No. 11,138,364.

(30) Foreign Application Priority Data

Apr. 17, 2018 (JP) .............................. JP2018-079441

(51) Int. Cl.
*G06F 40/111* (2020.01)
*G06F 3/04817* (2022.01)
(Continued)

(52) U.S. Cl.
CPC .......... *G06F 40/111* (2020.01); *G06F 3/0482* (2013.01); *G06F 3/04817* (2013.01); *G06F 17/11* (2013.01); *G06T 11/206* (2013.01)

(58) Field of Classification Search
CPC .......... G06F 3/017; G06F 9/451; G06F 3/011; G06F 9/3836; G06F 9/3017; G06F 9/04
See application file for complete search history.

(56) References Cited

U.S. PATENT DOCUMENTS 5,469,538 A * 11/1995 Razdow .................. G06F 17/10
715/776
10,061,498 B2    8/2018 Endo
(Continued)

FOREIGN PATENT DOCUMENTS

JP    2003296285 A    10/2003
JP    2014215630 A    11/2014

OTHER PUBLICATIONS

Desmos User Guide translated by Horikawa Apr. 16, 2018. (Year: 2018).*

(Continued)

*Primary Examiner* — Cao H Nguyen
(74) *Attorney, Agent, or Firm* — Holtz, Holtz & Volek PC

(57) ABSTRACT

An information processing method includes displaying a graph on a display screen of a display, in response to a user operation of specifying at least part of the graph, displaying an icon corresponding to a numerical value which is associated with the at least part of the graph on the display screen, in response to a user operation of selecting the icon, as at least part of a mathematical expression to execute calculation using the numerical value which is associated with the icon selected, displaying the numerical value or a variable indicating the numerical value which is associated with the icon on the display screen.

20 Claims, 9 Drawing Sheets

(51) Int. Cl.
    *G06F 3/0482*     (2013.01)
    *G06F 17/11*     (2006.01)
    *G06T 11/20*     (2006.01)

(56) References Cited

U.S. PATENT DOCUMENTS

| | | | |
|---|---|---|---|
| 2011/0302228 A1* | 12/2011 | Brothers | G06F 15/02 708/130 |
| 2012/0107779 A1 | 5/2012 | Halton et al. | |
| 2015/0310646 A1* | 10/2015 | Karoji | G06T 11/206 345/440 |

OTHER PUBLICATIONS

"Desmos", desmos User Guide, translated by Horikawa, Y., retrieved Apr. 16, 2018, https://desmos.s3.amazonaws.com/Desmos_User_Gude_JA.pdf.

Extended European Search Report (EESR) dated Jul. 7, 2020 issued in European Application No. 19168069.3.

Japanese Office Action (and English language translation thereof) dated Feb. 22, 2022, issued in counterpart Japanese Application No. 2018-079441.

\* cited by examiner

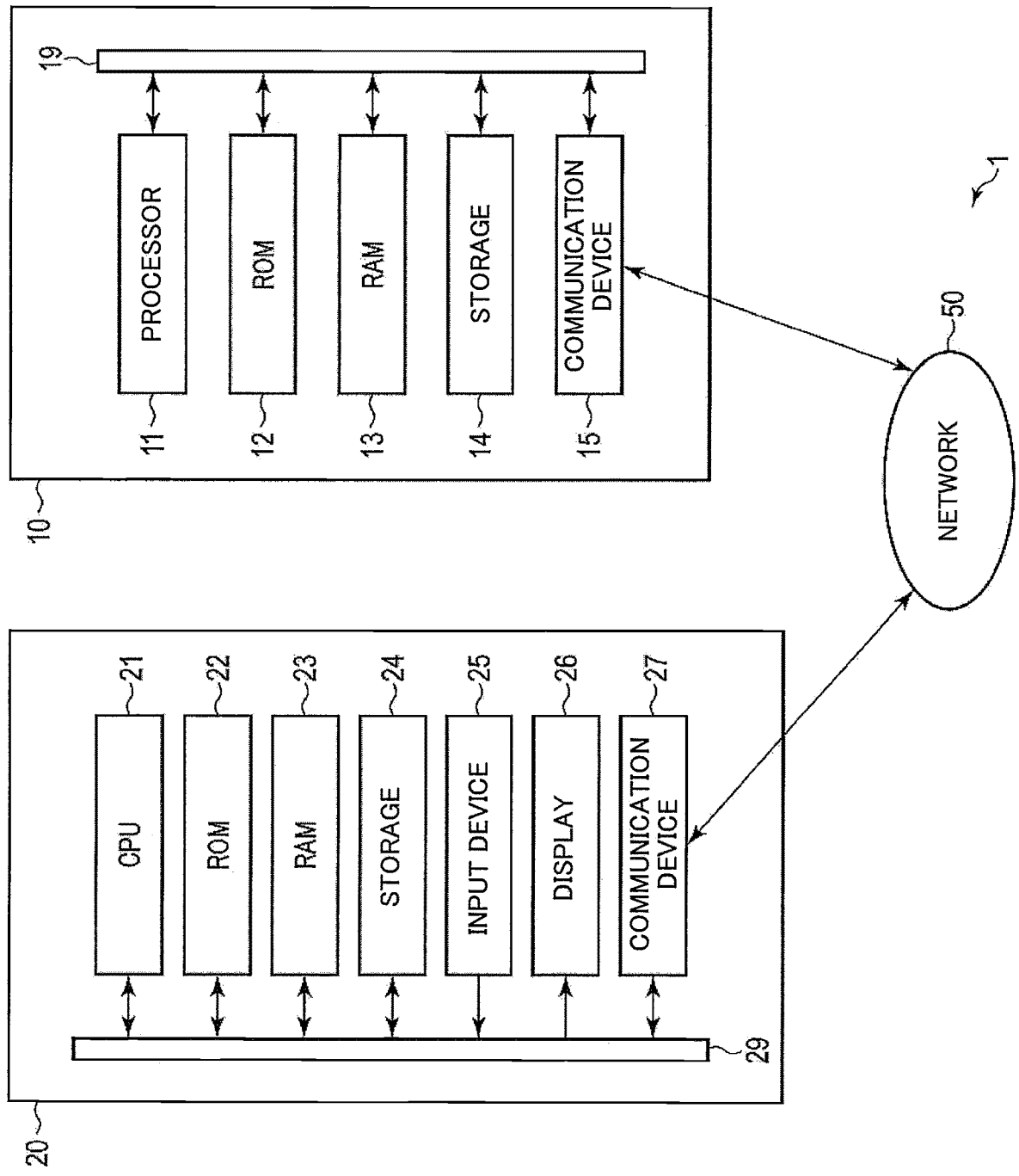

ELECTRONIC APPARATUS, INFORMATION PROCESSING METHOD, AND RECORDING MEDIUM

CROSS-REFERENCE TO RELATED APPLICATIONS

This application is a Continuation Application of U.S. application Ser. No. 16/377,653, filed on Apr. 8, 2019, which is based upon and claims the benefit of priority from the prior Japanese Patent Application No. 2018-079441, filed on Apr. 17, 2018, the entire contents all of which are incorporated herein by reference.

BACKGROUND OF THE INVENTION

1. Field of the Invention

The present invention relates to an electronic apparatus, an information processing method, and a recording medium.

2. Description of the Related Art

There are known graph drawing applications usable on web browsers. For example, there is disclosed in a non-patent literature (Desmos, desmos User Guide, translated by HORIKAWA, Y., retrieved Apr. 16, 2018, from https://desmos.s3.amazonaws.com/Desmos_User_Guide_JA.pdf) an application which runs on a web browser(s) for executing arithmetic operations on the basis of mathematical expressions input by a user(s) into an expression list, and drawing graphs on the web browser on the basis of results of the arithmetic operations.

SUMMARY OF THE INVENTION

This type of technology is requested to have a convenient input mode. Advantages of the present invention include providing the convenient input mode.

According to an aspect of the present invention, there is provided an information processing method including:

causing an electronic apparatus to display, in a screen of a display of the electronic apparatus, a graph frame, a mathematical expression input frame, and a line visually connecting the mathematical expression input frame and the graph frame, in response to a user operation;

causing the electronic apparatus to send, to outside of the electronic apparatus, first mathematical expression data on a first mathematical expression input in the mathematical expression input frame by a user operation;

executing an arithmetic operation based on the first mathematical expression data sent from the electronic apparatus, and sending, to the electronic apparatus, graph data visualizing the first mathematical expression as a result of the arithmetic operation based on the first mathematical expression data;

causing the electronic apparatus to display a graph based on the graph data in the graph frame;

causing the electronic apparatus to display, in the screen, (i) at least one coordinate display frame including coordinates of at least one point on the graph specified by a user operation, and coordinate icons symbolizing coordinate values of the coordinates of the at least one point, and (ii) a line visually connecting the at least one coordinate display frame and the graph frame;

causing the electronic apparatus to display an arithmetic setting frame in the screen;

causing the electronic apparatus to send, to the outside of the electronic apparatus, second mathematical expression data on a second mathematical expression formed in the arithmetic setting frame by at least a part of the coordinate icons being selected by a user operation;

executing an arithmetic operation based on the second mathematical expression data sent from the electronic apparatus, and sending, to the electronic apparatus, arithmetic result data of the second mathematical expression as a result of the arithmetic operation based on the second mathematical expression data; and causing the electronic apparatus to display an arithmetic result of the second mathematical expression based on the arithmetic result data of the second mathematical expression in the screen.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention, wherein:

FIG. 1 is a block diagram schematically showing an example of configuration of a system according to an embodiment(s);

DETAILED DESCRIPTION OF THE PREFERRED EMBODIMENTS

Figure 2A:
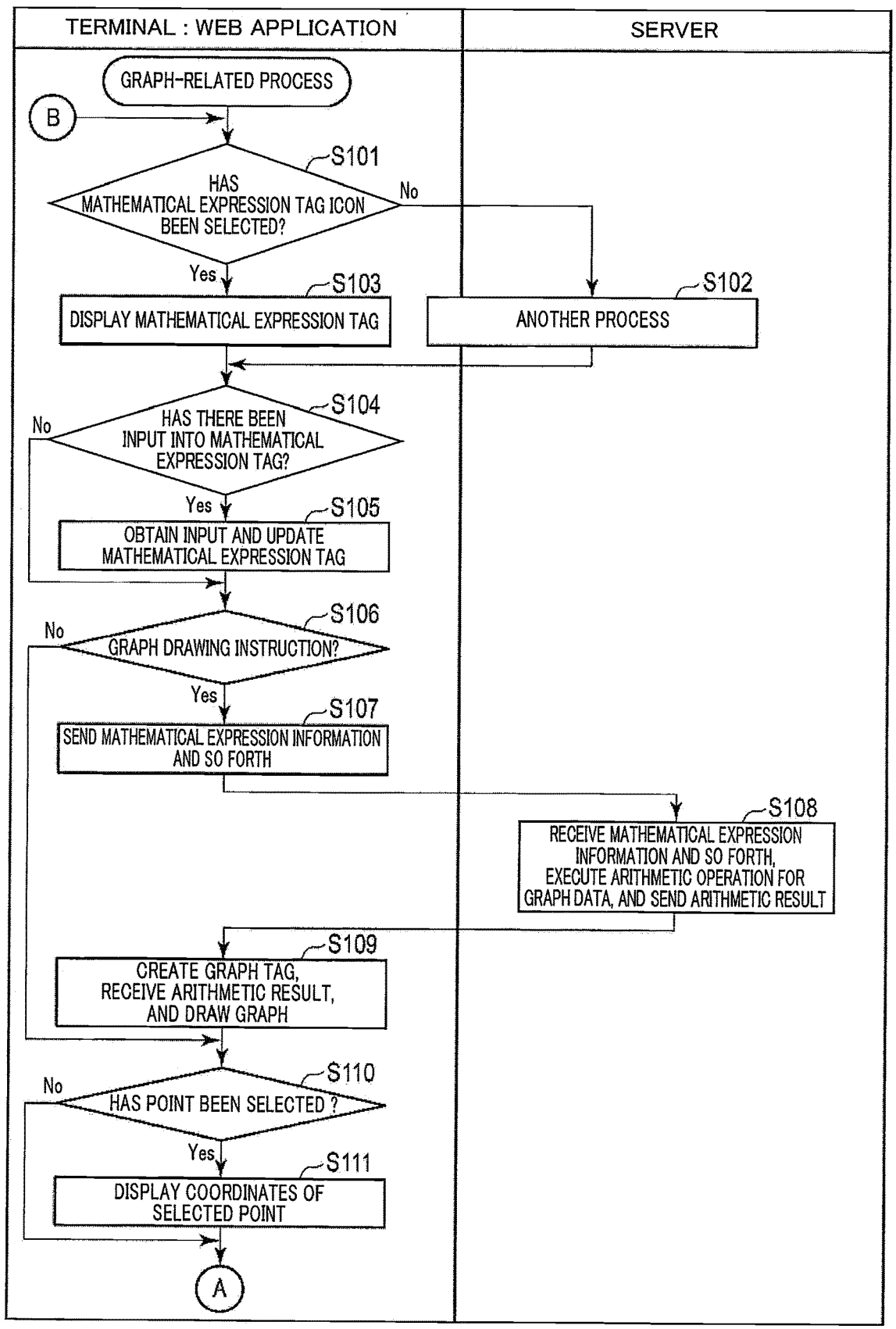
FIG. 2A is a flowchart showing outline of an example of a part of a graph-related process.

Hereinafter, one or more embodiments of the present invention will be described with reference to the drawings. The embodiments relate to applications which utilize the Web, and are used, for example, in school education. The applications of the embodiments are especially used in mathematics education.

<Configuration of System>

FIG. 1 is a diagram schematically showing an example of configuration of a system 1 according to an embodiment(s). The system 1 includes a server 10 and a terminal 20 (electronic apparatus) as a client. Examples of the terminal 20 include a personal computer (PC), a tablet information terminal, and a smartphone. On each of such terminals, a web browser runs. Using the web browser, each terminal accesses the server 10 via a network 50, such as the Internet, and executes web applications. Hence, in the embodiment, the terminal 20 performs display in accordance with a program(s) as a web application(s). The programs, which are web applications, may be stored in a read only memory (ROM) 12 of the server 10, or may be stored in a memory of a computer other than the server 10. In the latter case, the computer, where the programs are stored, connects with the terminal 20 via the network 50.

FIG. 1 shows one terminal 20, but any number of terminals may be included in the system 1. Any number of terminals may access the server 10 and execute web applications.

As shown in FIG. 1, the terminal 20 includes a central processing unit (CPU) 21, a read only memory (ROM) 22, a random access memory (RAM) 23, a storage 24, an input device 25, a display 26, and a communication device 27 which connect with one another via a bus line 29. The CPU 21 performs various types of signal processing and so forth. Instead of or in addition to the CPU 21, any type of integrated circuit, such as an application-specific integrated circuit (ASIC), a field-programmable gate array (FPGA), or a graphics processing unit (GPU), may be used. That is, the terminal 20 may use any type of processor. The ROM 22 stores a startup program and so forth. The RAM 23 functions as a main storage device for the CPU 21. As the RAM 23, for example, a dynamic RAM (DRAM) or a static RAM (SRAM) is used. As the storage 24, for example, a hard disk drive (HDD), a solid-state drive (SSD), or an embedded MultiMediaCard (eMMC) is used. The storage 24 stores programs and various types of information, such as parameters, used by the CPU 21. The RAM 23 and the storage 24 are not limited to the above respective examples, and each may be replaced by any type of storage device. The input device 25 is, for example, a keyboard, a mouse, and/or a touchscreen. The display 26 is, for example, a liquid crystal display or an organic EL display. The communication device 27 is used to communicate with apparatuses external to the terminal 20. The communication device 27 connects to the network 50, such as the Internet.

As shown in FIG. 1, the server 10 is an information processing apparatus, and includes a processor 11, a ROM 12 mentioned above, a RAM 13, a storage 14, and a communication device 15 which connect with one another via a bus line 19. The processor 11 performs various types of signal processing and so forth. The ROM 12 stores information used in operation of the processor 11. The RAM 13 functions as a main storage device for the processor 11. As the storage 14, any type of storage medium may be used. The storage 14 stores programs and various types of information, such as parameters, used by the processor 11.

[Screen Example]

An example of screens (windows) displayed on the display screen of the display 26 of the terminal 20 according to the embodiment will be described with reference to FIG. 4D. In the embodiment, unless otherwise stated, the processor 11 is the main controller. Further, input and display are performed by using combination of small display regions having frames. The display regions are referred to as "tags" (e.g., sticky notes). Each tag is attachable to any position on the display screen of the display 26, and also can be zoomed from a predetermined size. There are multiple types of tags. A screen 214 shown in FIG. 4D includes a mathematical expression tag 230 (mathematical expression input frame), a graph tag 250 (graph frame), a characteristic quantity (coordinates) tag 260 (coordinate display frame), and an arithmetic tag 270 (arithmetic setting frame) which are independent from one another.

The mathematical expression tag 230 is a tag where a mathematical expression(s) representing a function(s) is input. The graph tag 250 is a tag where a graph(s) is drawn. The characteristic quantity (coordinates) tag 260 is a tag where coordinates of a point(s) specified on the graph drawn in the graph tag 250 are displayed. The arithmetic tag 270 is a tag where an arithmetic expression(s) for any type of arithmetic operation desired by a user is input, and a result of the arithmetic operation (arithmetic result) is displayed. Mutually-related tags are visually connected by a line(s) which is referred to as "string(s)". Shape and length of the string are determined by relative positions of the mutually-related tags displayed on the display screen of the display 26.

The mathematical expression tag 230 includes a mathematical expression input area 231 and a tab 231T. Although only one set of the mathematical expression input area 231 and the tab 231T is displayed in FIG. 4D, the numbers of mathematical expression input areas and tabs increase or decrease according to the number of mathematical expressions to be input. If two or more tabs are present, the tabs are configured to be distinguishable from one another, for example, by having different colors. At the upper left corner of the mathematical expression tag 230, a status indicator 230C is provided.

The graph tag 250 includes a graph display area 255 where a coordinate system is set. In the graph display area 255, coordinate ranges predetermined or set in response to user operations are displayed. In the case of the screen 214 shown in FIG. 4D, the coordinate range of x coordinates is "$-3.2 \leq x \leq 4.1$", and the coordinate range of y coordinates is "$-1.6 \leq y \leq 5.9$". That is, the minimum value Xmin and the maximum value Xmax of x coordinates are $-3.2$ and $4.1$, respectively, and the minimum value Ymin and the maximum value Ymax of y coordinates are $-1.6$ and $5.9$, respectively.

Figure 4A:
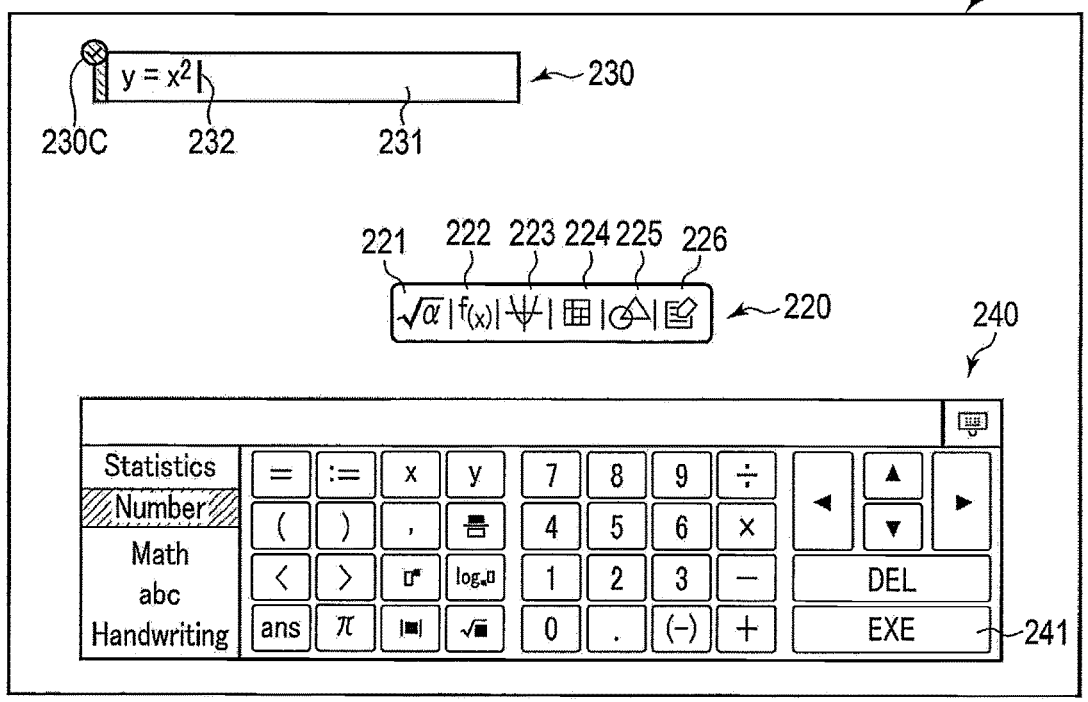
FIG. 4A is an illustration to explain graph-related operations, and shows an example of transition of screens which are displayed on a terminal.
Figure 4B:
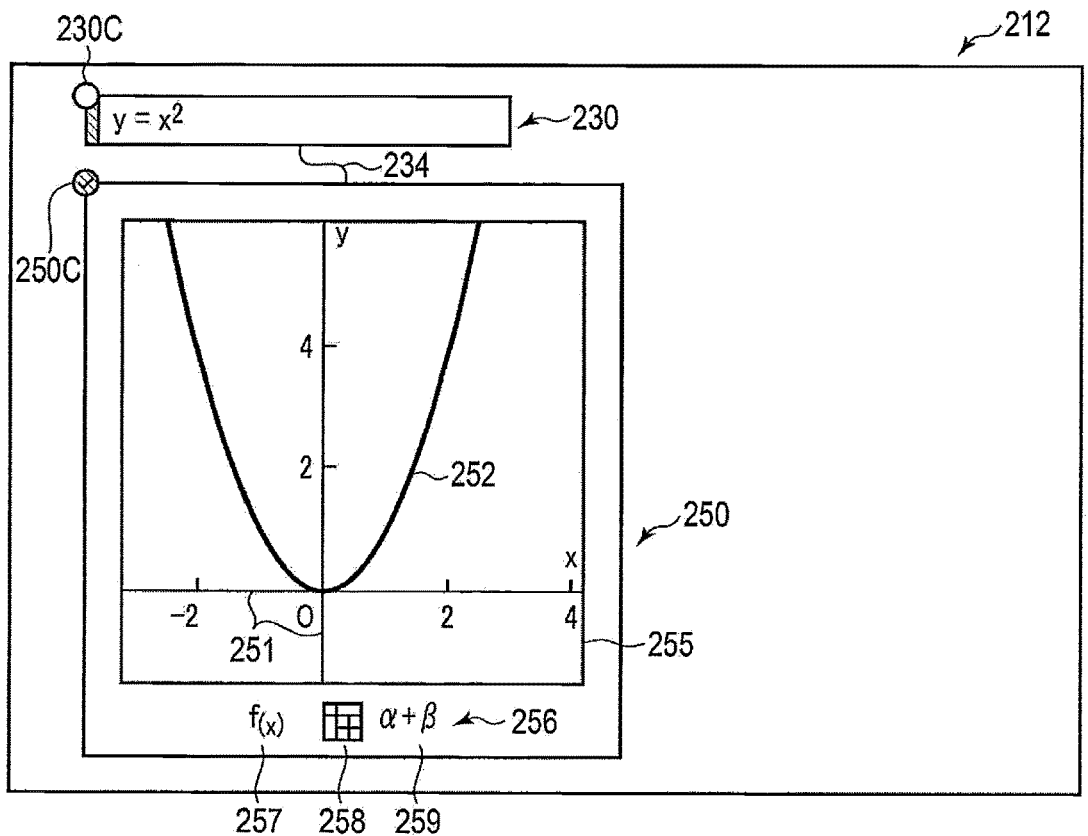
FIG. 4B is an illustration to explain the graph-related operations, and shows an example of transition of screens which are displayed on the terminal.
Figure 4C:
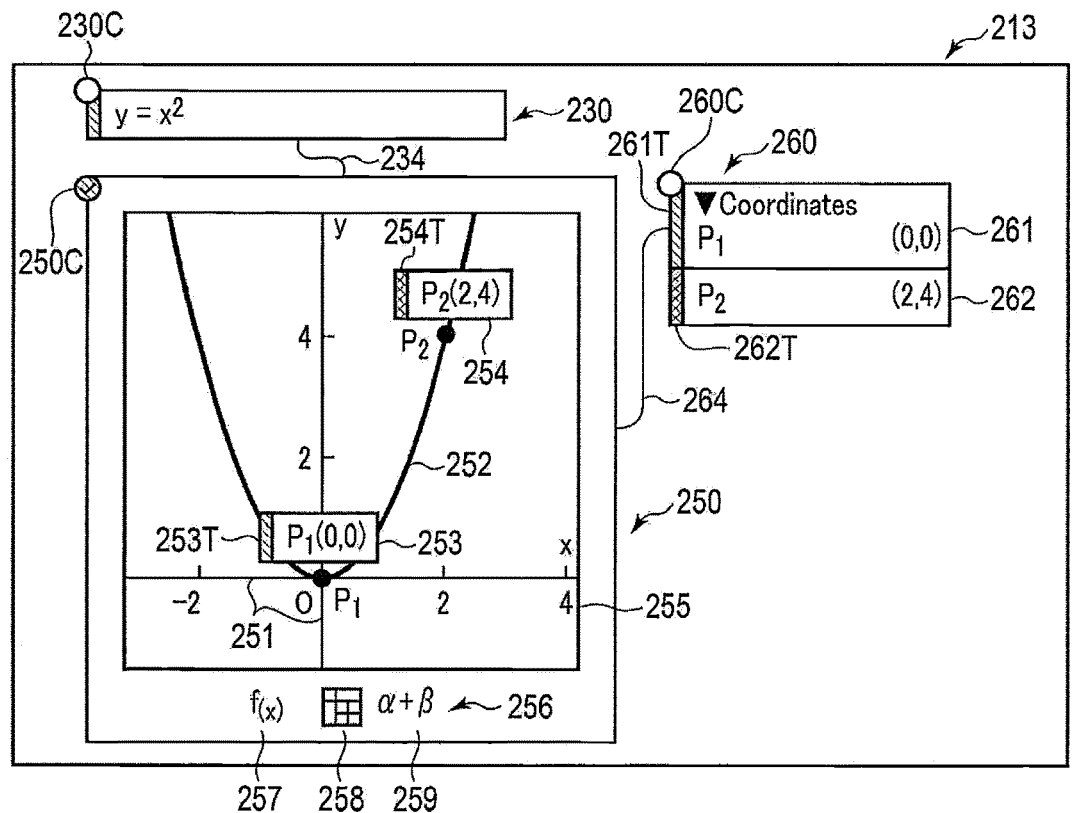
FIG. 4C is an illustration to explain the graph-related operations, and shows an example of transition of screens which are displayed on the terminal.
Figure 4D:
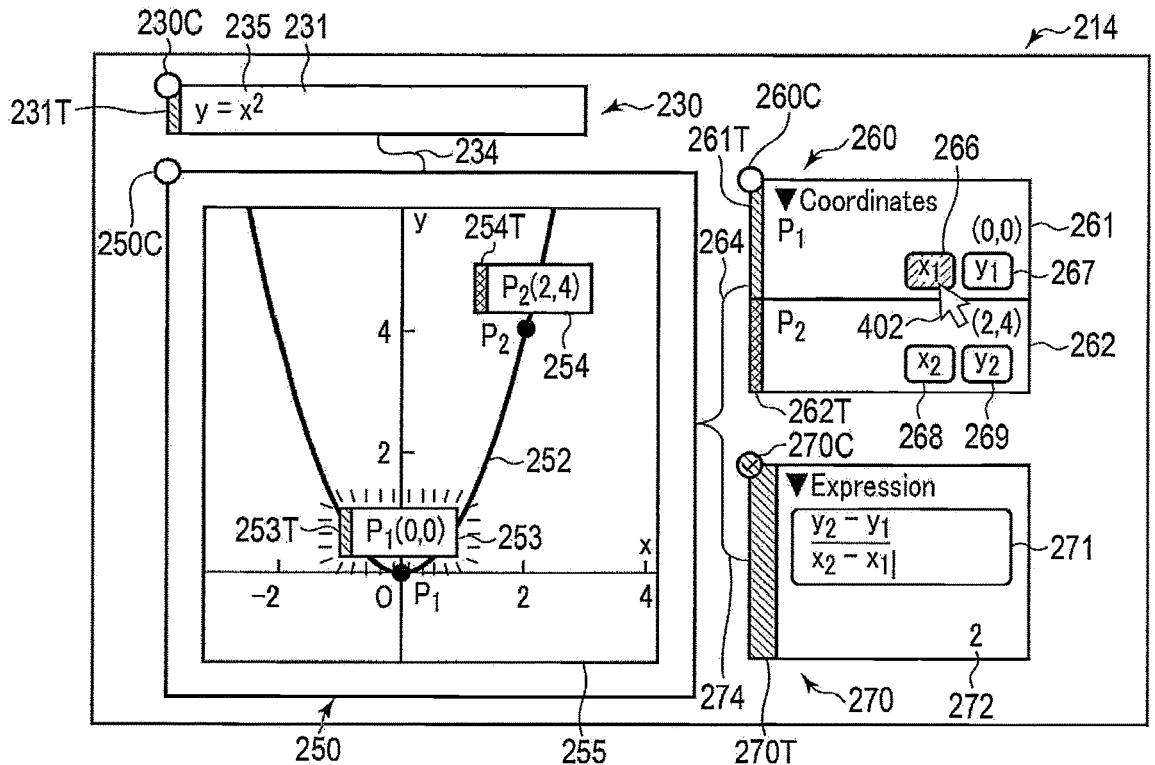
FIG. 4D is an illustration to explain the graph-related operations, and shows an example of transition of screens which are displayed on the terminal.

In the case of the screen 214 shown in FIG. 4D, in the mathematical expression input area 231 of the mathematical expression tag 230, a mathematical expression 235, "$y=x^2$", is input. The graph tag 250 is associated with the mathematical expression tag 230 by a string 234 (line). In the graph tag 250, a graph 252 representing the "$y=x^2$" is displayed in accordance with the mathematical expression 235 input in the mathematical expression input area 231 of the mathematical expression tag 230, which is associated with the graph tag 250. To indicate that the graph 252 represents the mathematical expression 235 input in the mathematical expression input area 231, it is preferable that the color of the line of the graph 252 be the same as the color of the tab 231T, which is associated with the graph 252 by the string 234. If a mathematical expression input area(s) is added, so that multiple mathematical expressions are input, and multiple graphs are drawn, it is preferable that the colors of the lines or the like of the graphs be the same as the colors of tabs attached to the mathematical expression input areas where the corresponding mathematical expressions are input. Such color correspondence makes it easy to recognize a correspondence relationship between mathematical expressions and graphs which are associated with one another by strings 234.

In the graph tag 250, for example, (i) a circular point representing a point $P_1$ and a first coordinate label 253 showing coordinates (0, 0) of the point $P_1$ which are displayed in response to the user specifying a point being to be the point $P_1$ on the graph 252 and (ii) a circular point representing a point P2 and a second coordinate label 254 showing coordinates (2, 4) of the point P2 which are displayed in response to the user specifying a point being to be the point P2 on the graph 252 are both displayed. To the first coordinate label 253 and the second coordinate label 254, a tab 253T and a tab 254T are attached, respectively. The color of the tab 253T of the first coordinate label 253 and the color of the tab 254T of the second coordinate label 254 are different from one another. At the upper left corner of the graph tag 250, a status indicator 250C is provided.

The "$P_n$" (where n is a positive integer) arranged near each circular point on the graph 252 does not automatically appear. When a not-shown item "Show Label" is displayed in response to the user specifying, for example, the first coordinate label 253 which is displayed in the graph tag 250, and this item "Show Label" is selected by the user, the "$P_n$" is displayed on the left side of the coordinates in the first coordinate label 253 (i.e., near the circular point representing the point $P_1$). That is, the "n" in the "$P_n$" does not indicate that the point is $n^{th}$-specified by the user, but indicates that, among specified points on the graph 252, the point is an $n^{th}$ point (or a point n), for which the item "Show Label" has been selected.

Alternatively, a setting different from the above may be carried out as follows. After the $n^{th}$-specified point $P_n$, when the user specifies another point, which is the $(n+1)^{th}$-specified point, a number that (i) indicates where the point is in the order of being specified and (ii) is in automatic increments of one is assigned to the point, so that a circular point representing the $(n+1)^{th}$-specified point, "$P_{(n+1)}$" indicating that the point is $(n+1)^{th}$-specified, and coordinates of the $(n+1)^{th}$-specified point (i.e., point $P_{(n+1)}$) are displayed. The "$P_{(n+1)}$" and the coordinates of the $(n+1)^{th}$-specified point $P_{(n+1)}$ are arranged near the circular point.

In either case, the colors of the tabs (e.g., tabs 253T and 254T) created by the $1^{st}$ to $n^{th}$ points being specified are set so as to be different from one another automatically.

The characteristic quantity (coordinates) tag 260 includes, for example, a first tag 261 (coordinate display frame) showing the coordinates of the point $P_1$, and a second tag 262 (coordinate display frame) showing the coordinates of the point $P_2$. The first tag 261 shows the coordinates (0, 0) of the point $P_1$. In the first tag 261, a first candidate icon 266 (coordinate icon) and a second candidate icon 267 (coordinate icon) are displayed. The first candidate icon 266 indicates that the x coordinate of the point $P_1$ is $x_1$, and the second candidate icon 267 indicates that the y coordinate of the point $P_1$ is $y_1$. These icons may be selected by the user as described below. The second tag 262 shows the coordinates (2, 4) of the point $P_2$. In the second tag 262, a third candidate icon 268 (coordinate icon) and a fourth candidate icon 269 (coordinate icon) are displayed. The third candidate icon 268 indicates that the x coordinate of the point $P_2$ is $x_2$, and the fourth candidate icon 269 indicates that the y coordinate of the point $P_2$ is $y_2$. These icons may be selected by the user as described below. The characteristic quantity (coordinates) tag 260 is associated with the graph tag 250, and hence connected with the graph tag 250 by a string 264 (line).

To the first tag 261 and the second tag 262, a tab 261T and a tab 262T are attached, respectively. The color of the tab 261T of the first tag 261 and the color of the tab 262T of the second tag 262 are different from one another. The color of the tab 261T of the first tag 261 is set to be the same as the color of the tab 253T of the first coordinate label 253, and the color of the tab 262T of the second tag 262 is set to be the same as the color of the tab 254T of the second coordinate label 254. Such color correspondence makes it easy to recognize a correspondence relationship between coordinate labels and tags of a characteristic quantity (coordinates) tag. At the upper left corner of the characteristic quantity (coordinates) tag 260, a status indicator 260C is provided.

The arithmetic tag 270 includes an expression input area 271 and a solution display area 272. The arithmetic tag 270 is associated with the graph tag 250 by a string 274 (line). In the expression input area 271, an expression for an arithmetic operation is input. In the case of FIG. 4D, an expression using $x_1$, $x_2$, $y_1$, and $y_2$ shown in the characteristic quantity (coordinates) tag 260 is input in the expression input area 271. In the solution display area 272 locating under the expression input area 271 in the arithmetic tag 270, a solution of the expression input in the expression input area 271 is displayed. The arithmetic tag 270 has a tab 270T. The color of the tab 270T may change according to the expression input in the expression input area 271. For example, when an expression related to the graph 252 is input in the expression input area 271, the color of the tab 270T may be the same as the color of the graph 252, namely, the color of the tab 231T of the mathematical expression tag 230. At the upper left corner of the arithmetic tag 270, a status indicator 270C is provided.

The status indicator 230C of the mathematical expression tag 230, the status indicator 250C of the graph tag 250, the status indicator 260C of the characteristic quantity (coordinates) tag 260, and the status indicator 270C of the arithmetic tag 270 indicate whether or not the mathematical expression tag 230, the graph tag 250, the characteristic quantity (coordinates) tag 260, and the arithmetic tag 270 are in a selected status, respectively, and accordingly indicate which of these is in the selected status. In the case of FIG. 4D, the arithmetic tag 270 is in the selected status, so that the color of the status indicator 270C of the arithmetic tag 270 is different from the color(s) of the not-selected status indicators 230C, 250C and 260C, and also a check mark is displayed in the status indicator 270C. The user can move the tags on the screen 214. For example, the user selects one of the status indicators 230C, 250C, 260C and 270C by clicking the left mouse button, thereby selecting its tag, and dragging the selected tag to any position on the screen 214, thereby moving the selected tag on the screen 214. Hereinafter, the drag operation(s) is described as a drag operation(s) with the mouse, but may be replaced by a drag operation(s) with the touchscreen.

[Operation of System]

The system 1 of the embodiment has many functions. Hereinafter, some of these will be described. Each function is realized by the terminal 20 and the server 10 working in cooperation with one another. For example, when the terminal 20 where a web browser is running accesses the server 10, the terminal 20 obtains programs from the server 10. The terminal 20 executes the programs on the web browser. The terminal 20 executes various types of arithmetic operations and various types of display on the basis of information input onto the web browser by the user operating the input device 25 of the terminal 20. When arithmetic operations need to be executed by the server 10, the terminal 20 sends information necessary for the arithmetic operations to the server 10. The server 10 executes various types of arithmetic operations on the basis of information obtained from the terminal 20, and sends results of the arithmetic operations to the terminal 20. The terminal 20 displays various images on the display 26 on the basis of information obtained from the server 10.

<Graph-Related Function/Process>

Figure 2B:
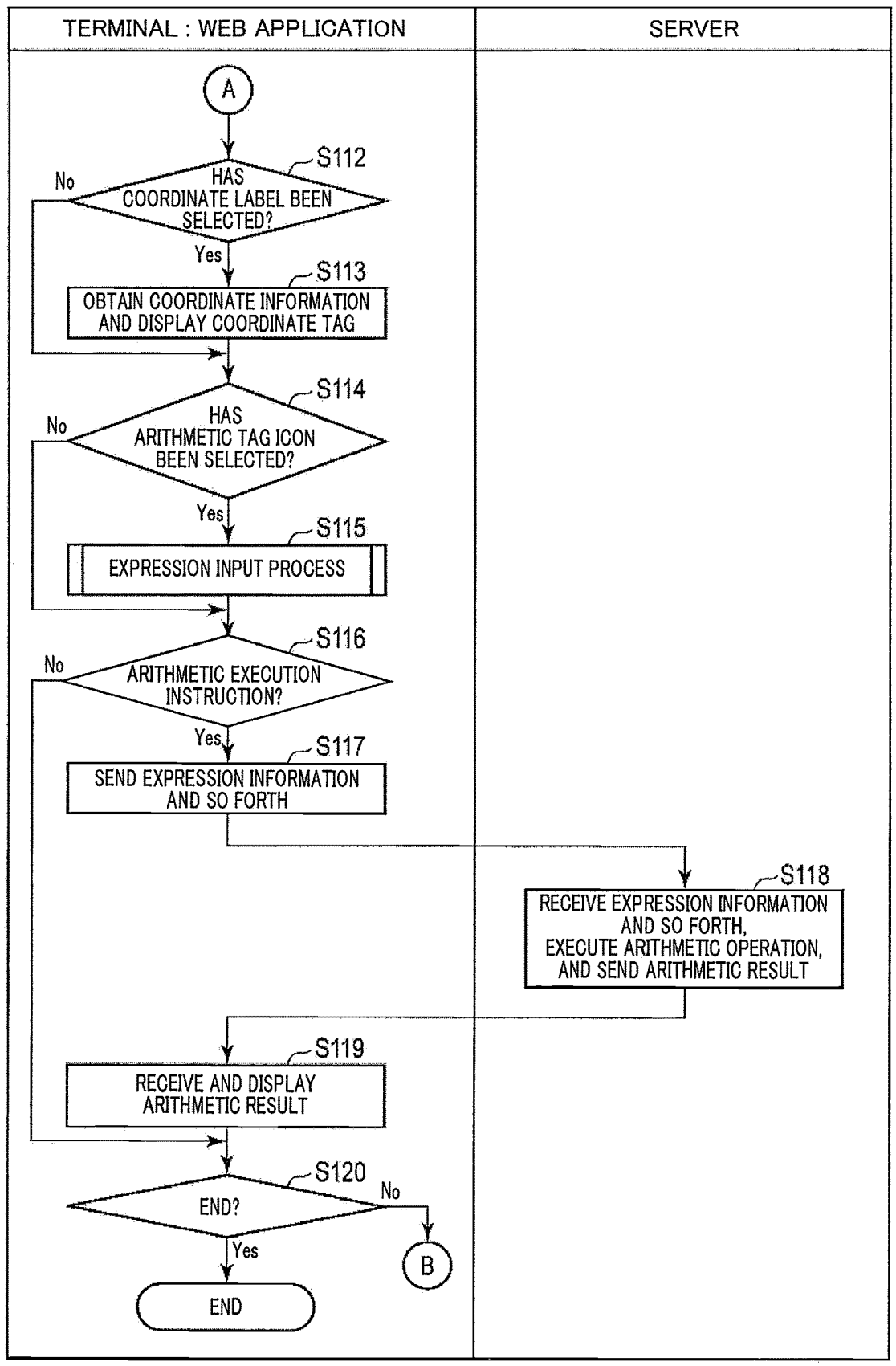
FIG. 2B is a flowchart showing outline of an example of the remaining part of the graph-related process.
Figure 3:
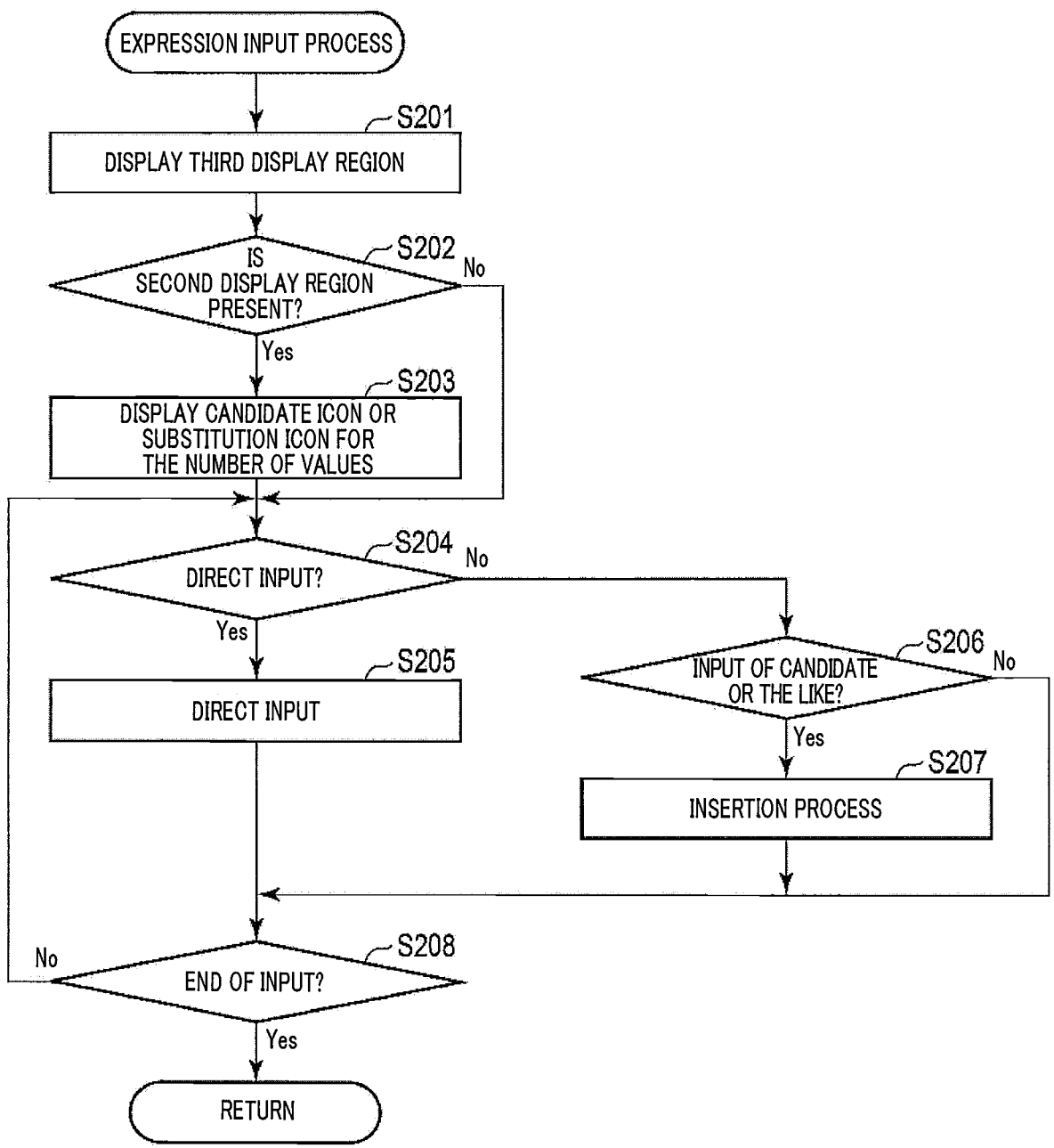
FIG. 3 is a flowchart showing outline of an example of an expression input process.

A graph-related function/process related to graph tags where graphs are displayed will be described with reference to FIG. 2A to FIG. 3 and FIG. 4A to FIG. 4D. FIG. 2A to FIG. 3 show flowcharts of the graph-related process and its sub-process (expression input process) performed by the system 1. FIG. 4A to FIG. 4D show screen examples.

FIG. 4A shows an example of a screen 211 displayed by the terminal 20. FIG. 4A shows an example of the screen 211 displayed when some of a series of actions/steps described hereinafter are performed. The screen 211 shown in FIG. 4A includes a menu 220. The menu 220 is a menu displayed when new tags are to be created. The menu 220 is displayed, for example, by clicking the right mouse button. The menu 220 includes an arithmetic tag icon 221, a mathematical expression tag icon 222, a graph tag icon 223, a mathematical table tag icon 224, a geometry tag icon 225, and a memo/note tag icon 226.

The arithmetic tag icon 221 is an icon for creating an arithmetic tag when selected. In the arithmetic tag, an expression is input, and a solution calculated on the basis of the expression by the server 10 is displayed. The mathematical expression tag icon 222 is an icon for creating a mathematical expression tag when selected. The mathematical expression tag is a tag where a mathematical expression(s) for a graph(s) to be displayed in a graph tag is input. The graph tag icon 223 is an icon for creating a graph tag when selected. The graph tag is a tag where a graph(s) is drawn. The mathematical table tag icon 224 is an icon for creating a mathematical table tag when selected. The mathematical table tag is used to input a mathematical table. The geometry tag icon 225 is an icon for creating a geometry tag when selected. The geometry tag is used to draw a figure or the like described below. The memo/note tag icon 226 is an icon for creating a memo/note tag when selected. The memo/note tag is a tag where a text is input.

As shown in FIG. 2A, in Step S101, the terminal 20 determines whether or not the mathematical expression tag icon 222 has been selected. When the terminal 20 determines that the mathematical expression tag icon 222 has not been selected, the graph-related process proceeds to Step S102. In Step S102, the terminal 20 performs a process different from the graph-related process described herein. The process performed in Step S102 is not limited to processes performed by the terminal 20 only, but includes processes performed by the terminal 20 in cooperation with the server 10. If it is unnecessary to perform any process, nothing is performed in Step S102. The graph-related process then proceeds to Step S104.

On the other hand, when the terminal 20 determines in Step S101 that the mathematical expression tag icon 222 has been selected, the graph-related process proceeds to Step S103. In Step S103, the terminal 20 displays, on the display 26, the screen 211 including the mathematical expression tag 230 which is empty. The empty mathematical expression tag 230 (not shown) means the mathematical expression tag 230 where no letter, numeral, mathematical expression or the like is displayed, but a cursor may be displayed depending on its status.

In Step S104, the terminal 20 determines whether or not there has been input into the mathematical expression tag 230. When the terminal 20 determines that there has been no input thereinto, the graph-related process proceeds to Step S106. On the other hand, when the terminal 20 determines that there has been input thereinto, the graph-related process proceeds to Step S105. For example, when the terminal 20 determines that the mathematical expression input area 231 of the mathematical expression tag 231 has been selected, the graph-related process proceeds to Step S105. In Step S105, the terminal 20 displays a software keyboard 240 on the screen 211. FIG. 4A shows an example of the software keyboard 240 displayed on the screen 211, and also shows that a mathematical expression "$y=x^2$" being input in the mathematical expression input area 231 of the mathematical expression tag 230 is not fixed yet. In the mathematical expression input area 231 of the mathematical expression tag 230, a cursor 232 is displayed right behind the mathematical expression "$y=x^2$". This indicates that the mathematical expression being input is not fixed yet. The software keyboard 240 includes virtual keys necessary to input mathematical expressions, for example, virtual keys to input numerical values and mathematical symbols. The user inputs mathematical expressions using the software keyboard 240. Further, in Step S105, the terminal 20 obtains user's input operations onto the software keyboard 240. The terminal 20 may be configured such that the user can input mathematical expressions using the keyboard of the input device 25. Still further, in Step S105, the terminal 20 updates its internal status about the mathematical expression tag 230, for example, updates data in response to the input operations (i.e., input mathematical expression), and updates the displayed contents of the mathematical expression tag 230 on the screen 211. The graph-related process then proceeds to Step S106.

In Step S106, the terminal 20 determines whether or not an instruction to draw a graph (graph drawing instruction) has been input during a predetermined period of time. For example, when an "EXE" key 241 included in the software keyboard 240 is selected with the mathematical expression tag 230 selected, the terminal 20 determines that a graph drawing instruction has been input during a predetermined period of time. When the terminal 20 determines that no graph drawing instruction has been input during a predetermined period of time, the graph-related process proceeds to Step S110. On the other hand, when the terminal 20 determines that a graph drawing instruction has been input during a predetermined period of time, the graph-related process proceeds to Step S107.

In Step S107, the terminal 20 identifies necessary information such as the mathematical expression input in the mathematical expression tag 230 and information on a graph drawing/display range (coordinate ranges), and sends the identified information to the server 10.

In Step S108, the server 10 receives the information sent from the terminal 20, calculates data necessary to draw a graph, such as coordinates of points constituting the graph, on the basis of the received information, and sends data of a result(s) of the arithmetic operation (i.e., calculation) (arithmetic result data) to the terminal 20. Among the obtained information, arithmetic result data and so forth, the server 10 may store necessary information/data in a database.

In Step S109, the terminal 20 creates and displays a graph tag, receives the arithmetic result data from the server 10, and draws a graph in the graph tag on the basis of the received arithmetic result data. For example, the terminal 20 displays a graph by connecting, with a line, the coordinates of the points included in the received data. The graph-related process then proceeds to Step S110.

As a result of the above, as shown in FIG. 4B, a screen 212 which includes, in addition to the mathematical expression tag 230, the graph tag 250 associated with the mathematical expression tag 230 by the string 234 is displayed. In the graph display area 255 of the graph tag 250, (i) axes 251 on which the set coordinate ranges are displayed and (ii) the graph 252 are drawn. The graph 252 is a graph corresponding to the mathematical expression input in the mathematical expression tag 230.

The graph tag 250 includes a menu 256. The menu 256 includes a mathematical expression tag icon 257, a mathematical table tag icon 258, and an arithmetic tag icon 259. When the mathematical expression tag icon 257 of the graph tag 250 is selected, a new mathematical expression tag associated with the graph tag 250 is created. When a mathematical expression is input into this new mathematical expression tag, a graph corresponding to this mathematical expression is drawn in the graph tag 250. These actions correspond to Steps S101 to S109 described above.

When the mathematical table tag icon 258 of the graph tag 250 is selected, a new mathematical table tag associated with the graph tag 250 is created. When a mathematical table is input into this new mathematical table tag, on the basis of the mathematical table, points are plotted in the graph tag 250. When the arithmetic tag icon 259 of the graph tag 250 is selected, a new arithmetic tag associated with the graph tag 250 is created. When an expression is input into this new arithmetic tag, an arithmetic operation related to the graph tag 250 is executed, and its solution is displayed.

In Step S110, the terminal 20 determines whether or not a point on the graph 252 has been selected (specified). It should be noted that, for drawing the graph 252 (Step S109), the terminal 20 has used coordinates of points on the graph 252, and stored coordinate information on each point in the storage 24. The user points a desired position on the graph 252 or a position adjacent to the desired position with a graphic cursor using the mouse, and clicks the left mouse button, thereby selecting (specifying) a point on the graph 252. On the basis of the coordinate information on each point stored in the storage 24, the terminal 20 identifies, among the points, a point closest to the position pointed with the graphic cursor, and identifies coordinates of the identified point.

Alternatively, when the user points a position on the graph 252 with the graphic cursor, the terminal 20 may identify, among the points stored in the storage 24, a point closest to the pointed position, and identify coordinates of the identified point, without the user clicking the left mouse button. When the terminal 20 determines that no point has been selected, the graph-related process proceeds to Step S112. On the other hand, when the terminal 20 determines that a point has been selected, the graph-related process proceeds to Step S111. It should be noted that when it is determined in Step S106 that no graph drawing instruction has been input during a predetermined period of time, no graph is displayed on the display screen of the display 26. In this case, in Step S110, the terminal 20 determines whether or not a point in the graph display area 255 has been selected.

In Step S111, the terminal 20 displays the coordinates of the selected point. In the case of a screen 213 shown in FIG. 4C, when the point having the coordinates (0, 0) on the graph 252 is specified and selected by the user, the circular point representing the selected point and the first coordinate label 253 showing the coordinates (0, 0) of the selected point are displayed. Further, the item "Show Label" is displayed by the user specifying the first coordinate label 253, and "$P_1$" which is a name of the selected point is displayed on the left side of the coordinates in the first coordinate label 253 by the user selecting the item "Show Label". Similarly, when the point having the coordinates (2, 4) on the graph 252 is specified and selected by the user, the circular point representing the selected point and the second coordinate label 254 showing the coordinates (2, 4) of the selected point are displayed. Further, the item "Show Label" is displayed by the user specifying the second coordinate label 254, and "$P_2$" which is a name of the selected point is displayed on the left side of the coordinates in the second coordinate label 254 by the user selecting the item "Show Label". The graph-related process then proceeds to Step S112.

In Step S112, the terminal 20 determines whether or not a coordinate label has been selected. A coordinate label, such as the first coordinate label 253 or the second coordinate label 254, may be selected by the user pointing the position of the coordinate label on the screen 213 with the graphic cursor using the mouse, and clicking the left mouse button. When the terminal 20 determines that no coordinate label has been selected, the graph-related process proceeds to Step S114. On the other hand, when the terminal 20 determines that a coordinate label has been selected, the graph-related process proceeds to Step S113.

In Step S113, the terminal 20 obtains coordinate information on the selected coordinate label, creates, on the basis of the information, a coordinate tag showing coordinate information, and displays the coordinate tag on the screen 213. The graph-related process then proceeds to Step S114.

Thus, when determining in Step S112 that the first coordinate label 253 has been selected, in Step S113, the terminal 20 displays, like the screen 213 shown in FIG. 4C, the characteristic quantity (coordinates) tag 260 including the first tag 261, which is a coordinate tag. The first tag 261 includes information on the coordinates (0, 0) of the point $P_1$ shown by the first coordinate label 253. The color of the tab 261T of the first tag 261 is the same as the color of the tab 253T of the first coordinate label 253. Because the tab 261T of the first tag 261 and the tab 253T of the first coordinate label 253 have the same visual effect (same color), their mutual correspondence can be easily recognized at a glance. These tabs may have the same shading pattern and/or the same line representing the perimeter (same border), in addition to or instead of the same color.

When determining in Step S112 that the second coordinate label 254 has been selected, in Step S113, the terminal 20 displays the characteristic quantity (coordinates) tag 260 including the second tag 262, which is a coordinate tag. The second tag 262 includes information on the coordinates (2,4) of the point P2 shown by the second coordinate label 254. The color of the tab 262T of the second tag 262 is the same as the color of the tab 254T of the second coordinate label 254 while it is different from the color of the tab 261T of the first tag 261. Because the tab 262T of the second tag 262 and the tab 254T of the second coordinate label 254 have the same visual effect (same color), their mutual correspondence can be easily recognized at a glance. These tabs may have the same shading pattern and/or the same line representing the perimeter (same border), in addition to or instead of the same color.

When determining in Step S112 that the first coordinate label 253 and the second coordinate label 254 have been selected in order, in Step S113, the terminal 20 displays the characteristic quantity (coordinates) tag 260 including the first tag 261 and the second tag 262 as shown in FIG. 4C.

Each of the first tag 261 and the second tag 262 is a coordinate tag showing coordinates as a characteristic quantity. Like the characteristic quantity (coordinates) tag 260, tags showing the same type of characteristic quantity are collectively displayed. The system 1 of the embodiment can show not only coordinates but also various other types of characteristic quantity, such as slope, intercept, area, maximum value or local maximum, and minimum value or local minimum of a graph(s) as a figure(s). For each type of characteristic quantity, a characteristic quantity tag which collectively displays two or more tags showing the same type of characteristic quantity may be displayed. Because the characteristic quantity (coordinates) tag 260 is associated with the graph 252 shown in the graph tag 250, the characteristic quantity (coordinates) tag 260 is associated with the graph tag 250 by the string 264.

In Step S114, the terminal 20 determines whether or not the arithmetic tag icon 259 of the graph tag 250 has been selected. When the terminal 20 determines that the arithmetic tag icon 259 of the graph tag 250 has not been selected, the graph-related process proceeds to Step S116. On the other hand, when the terminal 20 determines that the arithmetic tag icon 259 of the graph tag 250 has been selected, the graph-related process proceeds to Step S115. In Step S115, the terminal 20 performs the expression input process. In the expression input process, the terminal 20 displays, like the screen 214 shown in FIG. 4D, the arithmetic tag 270. If one or more coordinate tags associated with numerical values or variables included in an arithmetic expression input in the expression input area 271 of the arithmetic tag 270 are all created on the basis of the one (same) graph 252 shown in the graph display area 255 of the graph tag 250, the color of the tab 270T of the arithmetic tag 270 may be the same as the display color of the one graph 252. In the embodiment, because the first tag 261 and the second tag 262 are both created on the basis of the one graph 252 shown in the graph display area 255 of the graph tag 250, the color of the tab 270T of the arithmetic tag 270 is the same as the display color of the graph 252.

The expression input process for inputting an expression into the expression input area 271 of the arithmetic tag 270 will be described later. The graph-related process then proceeds to Step S116.

In Step S116, the terminal 20 determines whether or not an instruction to execute an arithmetic operation (arithmetic execution instruction) has been input. Arithmetic execution instructions are input, for example, by the user selecting the "EXE" key 241 of the software keyboard 240 shown in FIG. 4A. When the terminal 20 determines that no arithmetic execution instruction has been input, the graph-related process proceeds to Step S120. On the other hand, when the terminal 20 determines that an arithmetic execution instruction has been input, the graph-related process proceeds to Step S117.

In Step S117, the terminal 20 sends information on the expression input in the expression input area 271 and so forth to the server 10. In the case of FIG. 4D, an expression "$(y_2-y_1)/(x_2-x_1)$" is input in the expression input area 271, and $y_2$, $y_1$, $x_2$, and $x_1$ are 4, 0, 2, and 0, respectively, as displayed in the characteristic quantity (coordinates) tag 260. The terminal 20 sends the expression and the values to the server 10.

In Step S118, the server 10 receives the expression information and so forth, executes an arithmetic operation of the obtained expression, and sends arithmetic result data to the terminal 20. In Step S119, the terminal 20 receives the arithmetic result data, and displays an arithmetic result in the solution display area 272 on the basis of the received arithmetic result data. The graph-related process then proceeds to Step S120.

In the case of FIG. 4D, in the solution display area 272 of the arithmetic tag 270, "2" is displayed as the arithmetic result. Consequently, the user grasps that the slope of a straight line connecting the point $P_1$ having the coordinates (0, 0) and the point $P_2$ having the coordinates (2, 4) is 2. Students' deeper understanding of mathematics is expected, for example, by projecting a series of images described above with a projector in a classroom to show the images to the students.

In Step S120, the terminal 20 determines whether or not to end the graph-related process. When the terminal 20 determines not to end the graph-related process, the graph-related process returns to Step S101 and repeats the above actions (steps). On the other hand, when the terminal 20 determines to end the graph-related process, the graph-related process ends.

The above actions (steps) are examples. Hence, some of them may be omitted, or other actions (steps) may be added. For example, the various tags may be moved in response to user operations. If the terminal 20 has necessary information including the arithmetic result, the terminal 20 may perform action(s) related thereto. As another example, when it is desired to change the graph drawing/display range (coordinate ranges), because the terminal 20 does not have coordinate information on each point necessary to draw a graph in a new drawing/display range, the terminal 20 requests the server 10 to recalculate coordinates.

The expression input process performed in Step S115 will be described with reference to FIG. 3. FIG. 3 shows its flowchart. In the expression input process, tags are defined as follows. A tag which is associated with an arithmetic tag icon selected, and includes a figure is referred to as "first display region". In the case of FIG. 4D, the selected arithmetic tag icon 259 (FIG. 4C) is associated with the graph tag 250 that includes the graph 252, which is a figure, so that the graph tag 250 is the first display region. A tag showing numerical value(s) associated with the first display region is referred to as "second display region". In the case of FIG. 4D, the characteristic quantity (coordinates) tag 260 showing the values of the coordinates associated with the graph tag 250, which is the first display region, is the second display region. The characteristic quantity (coordinates) tag 260 may include icons associated with the numerical values or alphanumerics representing the numerical values. A tag showing a calculation expression associated with the first display region is referred to as "third display region". In the case of FIG. 4D, the arithmetic tag 270 showing the calculation expression associated with the graph tag 250, which is the first display region, is the third display region. The first display region, the second display region, and the third display region are, at the default settings, set to be displayed so as not to overlap with one another if possible.

In Step S201, the terminal 20 displays the third display region. That is, in the case of FIG. 4D, the terminal 20 displays the arithmetic tag 270 on itself (display 26). The arithmetic tag 270 is a tag created by the arithmetic tag icon 259 of the graph tag 250 being selected, and associated with the graph tag 250. Hence, the arithmetic tag 270 is connected with the graph tag 250 by the string 274.

In Step S202, the terminal 20 determines whether or not the second display region, which is the characteristic quantity (coordinates) tag 260 in the case of FIG. 4D, is present. When the terminal 20 determines that the second display region is not present, the expression input process proceeds to Step S204. On the other hand, when the terminal 20 determines that the second display region is present, the expression input process proceeds to Step S203.

In Step S203, the terminal 20 displays candidate icon(s) or substitution icon(s) in the second display region for the number of values shown in the second display region. The expression input process then proceeds to Step S204. The substitution icons will be described later.

For example, in the case of FIG. 4D, the first tag 261 of the characteristic quantity (coordinates) tag 260 includes two values, namely, "0" as the x coordinate and "0" as the y coordinate of the point $P_1$. When two or more values are included as shown in FIG. 4D, the terminal 20 displays candidate icons for the respective values. Hence, in the first tag 261, the first candidate icon 266 displaying alphanumerics "$x_1$" representing the value of the x coordinate, "0", and the second candidate icon 267 displaying alphanumerics "$y_1$" representing the value of the y coordinate, "0", are displayed. Similarly, the second tag 262 of the characteristic quantity (coordinates) tag 260 includes two values, namely, "2" as the x coordinate and "4" as the y coordinate of the point P2. Hence, in the second tag 262, the third candidate icon 268 displaying alphanumerics "$x_2$" representing the value of the x coordinate, "2", and the fourth candidate icon 269 displaying alphanumerics "$y_2$" representing the value of the y coordinate, "4", are displayed.

In Step S204, the terminal 20 determines whether or not there has been a direct input(s) (for an expression) from the software keyboard 240 into the third display region, for example, into the expression input area 271 of the arithmetic tag 270 in the case of FIG. 4D. When the terminal 20 determines that there has been a direct input(s) from the software keyboard 240, the expression input process proceeds to Step S205.

In Step S205, the terminal 20 obtains a user's input(s) onto the software keyboard 240. The terminal 20 updates data on the input expression on the basis of the obtained input(s), and instructs itself to update the displayed contents according to the input(s). The expression input process then proceeds to Step S208.

When the terminal 20 determines in Step S204 that there has been no direct input from the software keyboard 240, the expression input process proceeds to Step S206. In Step S206, the terminal 20 determines whether or not a candidate icon or a substitution icon has been selected. When the terminal 20 determines that no candidate icon or substitution icon has been selected, the expression input process proceeds to Step S208. On the other hand, when the terminal 20 determines that a candidate icon or a substitution icon has been selected, the expression input process proceeds to Step S207.

When a candidate icon or the like included in the characteristic quantity (coordinates) tag 260 is selected, between the first coordinate label 253 and the second coordinate label 254 displayed in the graph tag 250 associated with the characteristic quantity (coordinates) tag 260, (i) the tab of a coordinate label corresponding to the selected candidate icon or the like and/or (ii) a point on the graph 252 shown by the coordinate label are visually changed to be different from their states before the candidate icon or the like is selected. This makes it easy to recognize, at a glance, to which part on the graph 252 the candidate icon or the like with a numerical value or a variable input corresponds. In the above case, after a candidate icon or the like is selected, its corresponding part in the graph display area 255 of the graph tag 250 may be made to blink at least for a predetermined period of time, may be made to change its color (dark/light) between before and after the selection operation, and/or may be made to change its thickness or size between before and after the selection operation. The same distinguishable display styles may be employed in Step S205 for the case of the direct input(s).

For example, as shown in FIG. 4D, when the first candidate icon 266 of the first tag 261 is pointed with a graphic cursor 402 and thereby selected, the first candidate icon 266 changes its color, and also the first coordinate label 253 blinks.

In Step S207, the terminal 20 performs an insertion process about the selected candidate icon or the like. The terminal 20 updates data on the input expression on the basis of the obtained input(s), and instructs itself to update the displayed contents according to the insertion process. The expression input process then proceeds to Step S208.

In Step S208, the terminal 20 determines whether or not to end the expression input process. When the terminal 20 determines not to end the expression input process, the expression input process returns to Step S204. That is, the expression input process continues. On the other hand, when the terminal 20 determines to end the expression input process, the expression input process ends.

An example of input (insertion process) of an expression into the expression input area 271 of the arithmetic tag 270 shown in FIG. 4D will be described. The numerator of the expression input in the expression input area 271 is "$y_2$-$y_1$". This "$y_2$-$y_1$" can be input by the following operations. In the selected status of the expression input area 271, the user selects the fourth candidate icon 269, "$y_2$", included in the second tag 262 of the characteristic quantity (coordinates) tag 260. As a result, "$y_2$" is inserted in the expression input area 271. Then, the user inputs "-" using the software keyboard 240. As a result, "$y_2$-" is displayed in the expression input area 271. Then, the user selects the second candidate icon 267, "$y_1$", included in the first tag 261 of the characteristic quantity (coordinates) tag 260. As a result, "$y_1$" is inserted in the expression input area 271, and accordingly the "$y_2$-$y_1$" is displayed therein. The user may input this "$y_2$-$y_1$" by direct inputs using the software keyboard 240, namely, by selecting/touching "y", "subscript key", "2", "-", "y", "subscript key", and "1" in this order, without using the candidate icons.

Thus, when a candidate icon is selected, an alphanumeric(s) associated with the icon is inserted into the expression input area 271. In the case of FIG. 4D, the alphanumerics "$x_1$", "$x_2$", and "$y_2$" respectively representing the numerical values "0", "0", "2", and "4" showing coordinates are inserted into the expression input area 271. When the candidate icons are selected, the numerical values "0", "0", "2", and "4" may be inserted thereinto.

Compared with the direct inputs, using the candidate icons as described in the embodiment makes input of expressions easy, and also prevents incorrect input thereof. Further, the displayed contents of the first coordinate label 253 and the second coordinate label 254, which are displayed in the graph tag 250 as the first display region, correspond to the displayed contents of the candidate icons, which are included in the characteristic quantity (coordinates) tag 260 as the second display region. Hence, the user can easily select each coordinate icon included in the characteristic quantity (coordinates) tag 260, looking at the graph tag 250.

<Figure-Related Function/Process>

Figure 5A:
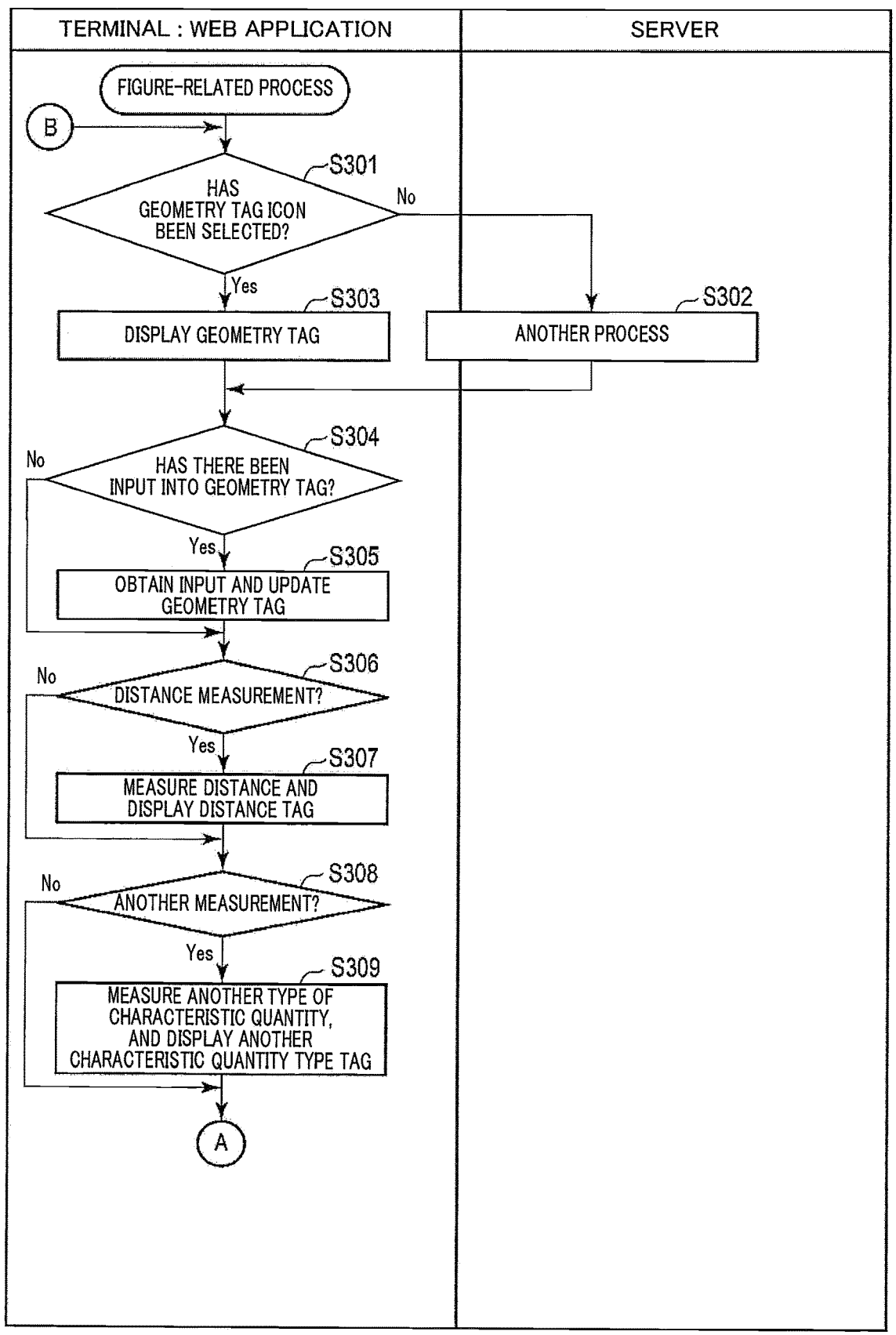
FIG. 5A is a flowchart showing outline of an example of a part of a figure-related process.
Figure 5B:
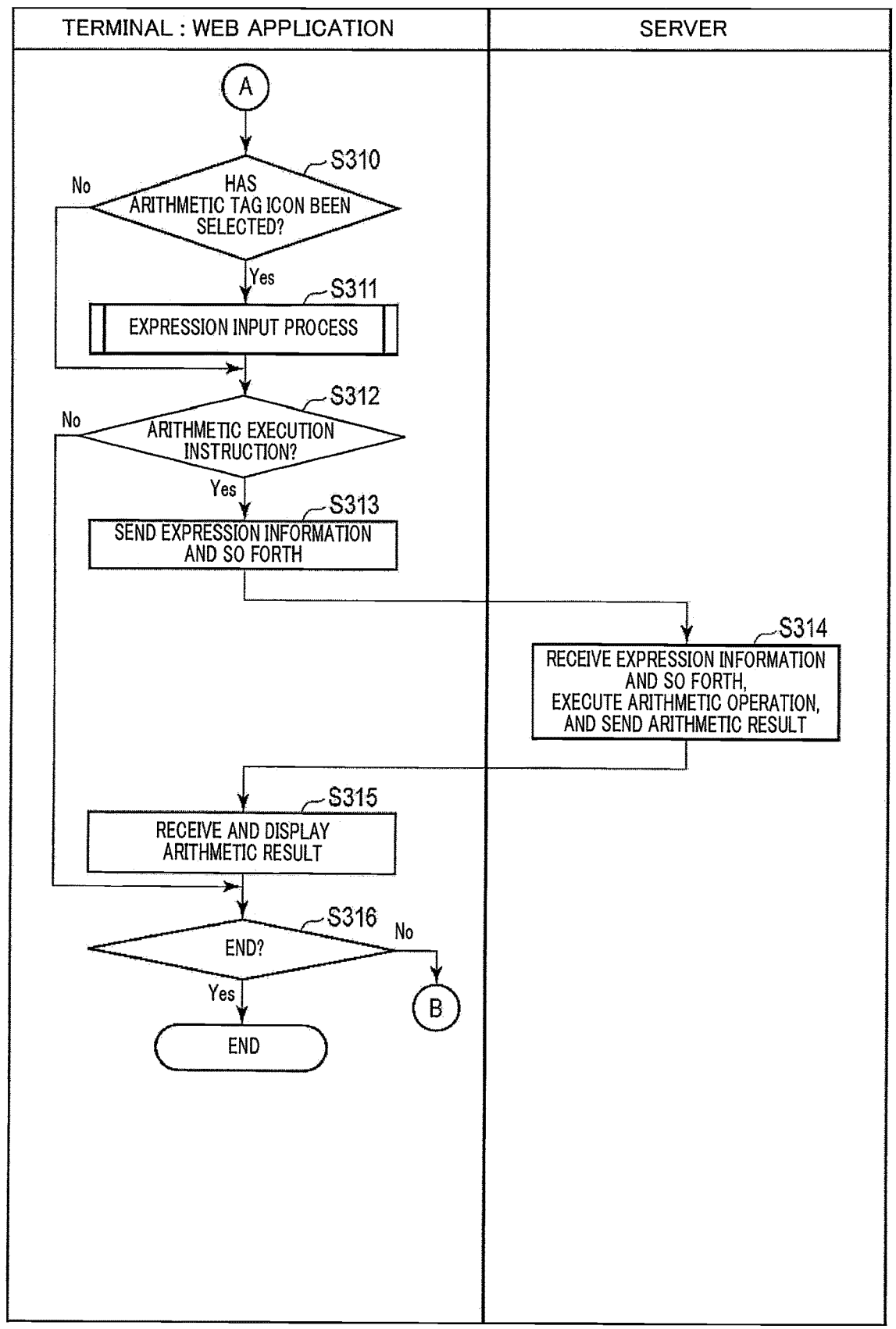
FIG. 5B is a flowchart showing outline of an example of the remaining part of the figure-related process.
Figure 6A:
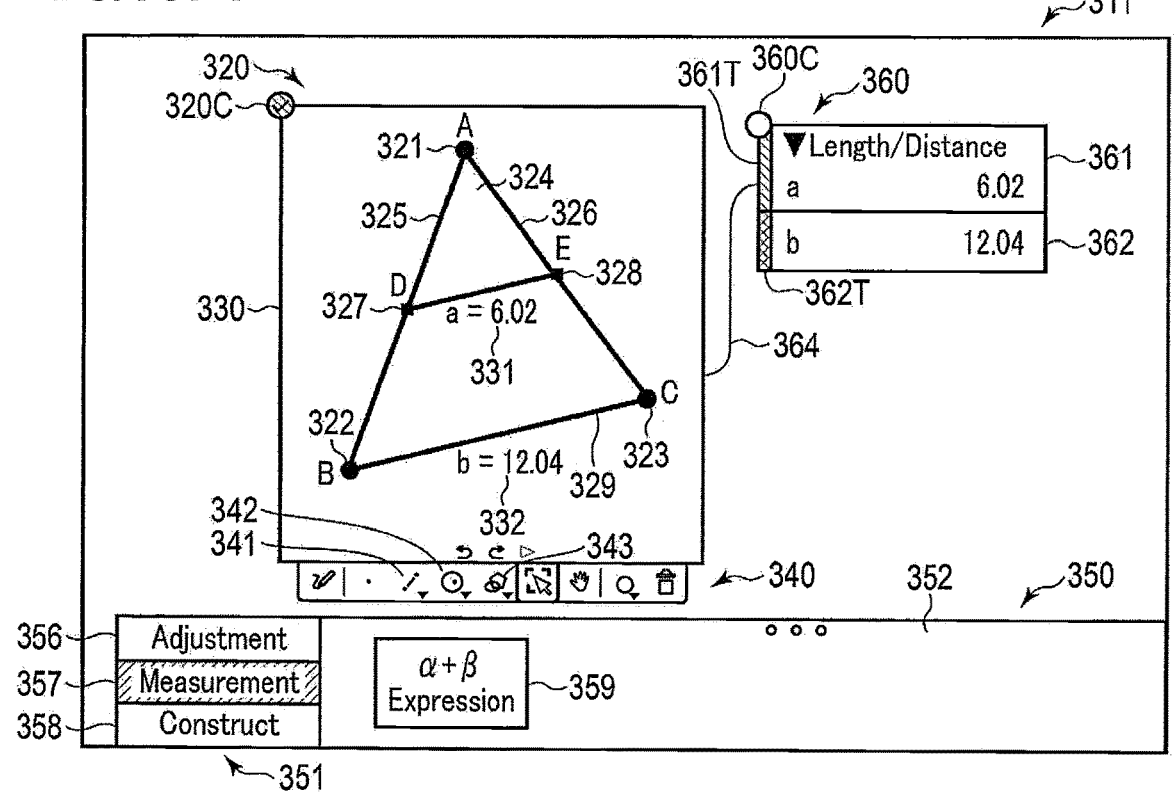
FIG. 6A is an illustration to explain figure-related operations, and shows an example of transition of screens which are displayed on the terminal.
Figure 6B:
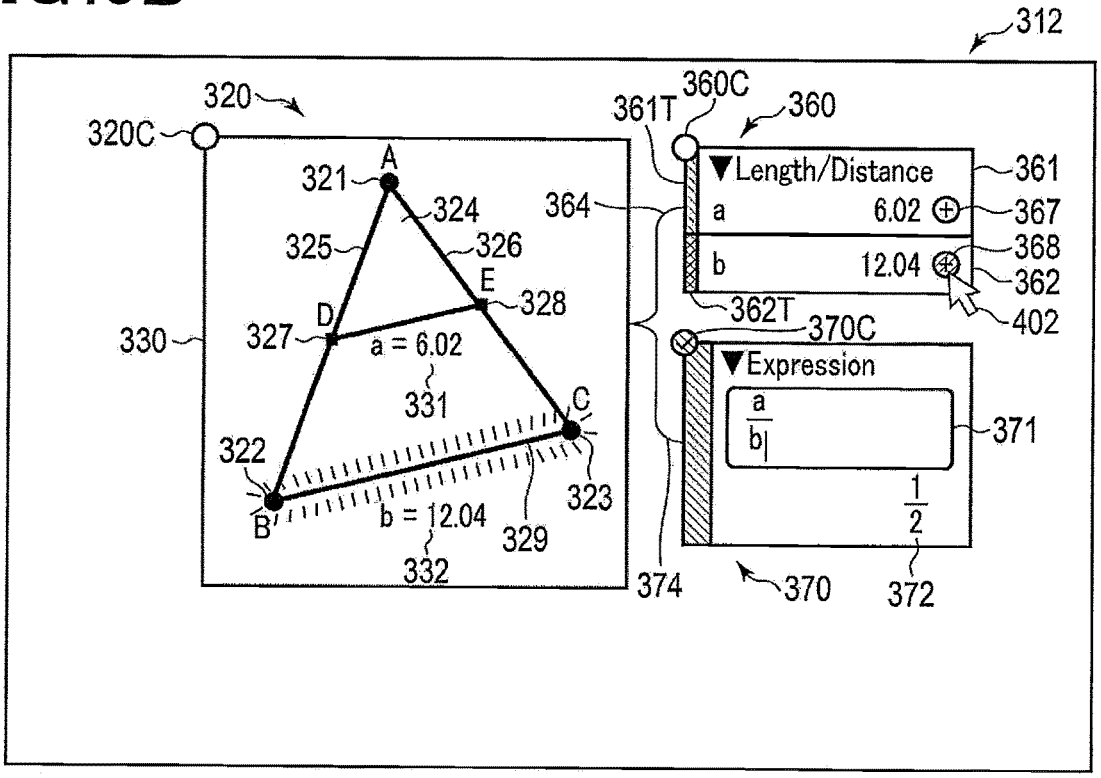
FIG. 6B is an illustration to explain the figure-related operations, and shows an example of transition of screens which are displayed on the terminal.

In the above, the graph-related function/process has been described with reference to FIG. 2A to FIG. 4D. Hereinafter, a figure-related function/process will be described with reference to FIG. 5A to FIG. 6B. FIG. 5A and FIG. 5B show flowcharts of the figure-related process. FIG. 6A and FIG. 6B show screen examples.

In Step S301, the terminal 20 determines whether or not the geometry tag icon 225 has been selected. The geometry tag icon 225 is an icon for creating a tag where a geometric figure is drawn. This geometry tag icon 225 is included in the menu 220 shown in FIG. 4A. When the terminal 20 determines that the geometry tag icon 225 has not been selected, the figure-related process proceeds to Step S302. In Step S302, the terminal 20 performs a process different from the figure-related process described herein. If it is unnecessary to perform any process, nothing is performed in Step S302. The figure-related process then proceeds to Step S304. On the other hand, when the terminal 20 determines in Step S301 that the geometry tag icon 225 has been selected, the figure-related process proceeds to Step S303.

In Step S303, the terminal 20 displays a geometry tag 320 which is empty. The empty geometry tag 320 (not shown) means the geometry tag 320 where no letter, numeral, mathematical expression, figure or the like is displayed, but a predetermined icon(s) or the like which is a component(s) of the geometry tag 320 may be displayed. FIG. 6A shows an example of a screen 311 displayed by the terminal 20. FIG. 6A shows an example of the screen 311 displayed when some of a series of actions/steps described hereinafter are performed. In Step S303, the terminal 20 displays the empty geometry tag 320. The geometry tag 320 has a status indicator 320C which indicates whether or not the geometry tag 320 is in the selected status.

In Step S304, the terminal 20 determines whether or not there has been input into the geometry tag 320. When the terminal 20 determines that there has been no input thereinto, the figure-related process proceeds to Step S306. On the other hand, when the terminal 20 determines that there has been input thereinto, the figure-related process proceeds to Step S305.

As shown in FIG. 6A, when the geometry tag 320 is selected, a drawing menu 340 and a geometry menu 350 are displayed on the screen 311. The drawing menu 340 includes various icons for drawing figures in the geometry tag 320. The geometry menu 350 includes a category area 351 and a display area 352. The user who would like to draw a figure in the geometry tag 320 selects an icon for the figure which the user desires to draw from the drawing menu 340. The drawing menu 340 includes a line icon 341 for drawing lines, a circle icon 342 for drawing circles, and a polygon icon 343 for drawing polygons. The user selects, from these icons, an icon for the figure which the user desires to draw.

FIG. 6A shows a case where the polygon icon 343 for drawing polygons is selected, and a triangle is drawn. The user plots a first point A/321, a second point B/322, a third point C/323, and the first point A/321 in this order. As a result, a triangle ABC/324 is drawn in the geometry tag 320.

In the embodiment, a function to plot middle points of sides is provided. The user selects a middle point icon which is displayed in the display area 352 by the user selecting a "Construct" icon 358 from the category area 351, and then selects the first point A/321 and the second point B/322, so that the middle point of a side AB/325 is displayed as a first middle point D/327. Further, the user selects the middle point icon, and then selects the first point A/321 and the third point C/323, so that the middle point of a side AC/326 is displayed as a second middle point E/328.

The above actions are performed in Step S305. In Step S305, the terminal 20 obtains user's input operations, performs the various actions on the basis of the obtained input operations, and displays, in the geometry tag 320, an image supposed to be displayed. For example, when vertexes of a polygon are selected, the terminal 20 stores coordinates of the vertexes. Further, the terminal 20 displays the points (vertexes) and lines which connect the points. The figure-related process then proceeds to Step S306.

In the embodiment, a function to measure distances between points as the characteristic quantity of figures is provided. The user selects a distance measurement icon which is displayed in the display area 352 by the user selecting a "Measurement" icon 357 from the category area 351, and then selects the first middle point D/327 and the second middle point E/328, so that the distance between the first middle point D/327 and the second middle point E/328 is displayed as a first distance 331. Further, the user selects the distance measurement icon, and then selects the second point B/322 and the third point C/323, so that the distance between the second point B/322 and the third point C/323 is displayed as a second distance 332. Similarly, in the embodiment, a function to measure lengths of line segments as the characteristic quantity of figures may be provided. The user selects a length measurement icon which is displayed in the display area 352 by the user selecting the "Measurement" icon 357 from the category area 351, and then selects a side BC/329, which connects the second point B/322 and the third point C/323, so that the length of the side BC/329 is displayed. In a figure display area 330 of the geometry tag 320, a coordinate system is set, and coordinate ranges predetermined or set in response to user operations are assigned thereto. At the default settings, coordinate axes (x axis and y axis) and coordinate graduations to indicate the coordinate ranges are hidden. The distances and the lengths are determined on the basis of numerical values in the coordinate ranges.

Similarly, in the embodiment, a function to measure interior angles or exterior angles formed by lines as the characteristic quantity of figures is provided. The user selects an interior angle measurement icon or an exterior angle measurement icon which is displayed in the display area 352 by the user selecting the "Measurement" icon 357 from the category area 351, and then selects lines, so that an angle, which is an interior angle or an exterior angle, formed by the lines is displayed. Similarly, functions to measure areas of figures, circumferences or perimeters of figures, directions or slopes of lines, and so forth as the characteristic quantity of figures may be provided. Thus, the application(s) can provide functions to measure various types of characteristic quantity of geometric figures.

In Step S306, the terminal 20 determines whether or not the distance measurement icon has been selected. When the terminal 20 determines that the distance measurement icon has not been selected, the figure-related process proceeds to Step S308. On the other hand, when the terminal 20 determines that the distance measurement icon has been selected, the figure-related process proceeds to Step S307.

In Step S307, the terminal 20 calculates, on the basis of coordinates of points selected by the user, information on the distance between the points, and displays the calculated distance. The position where the distance is displayed is preferably, in the figure display area 330 of the geometry tag 320, near a line segment which connects the points. In Step S307, the terminal 20 also displays a characteristic quantity (distance) tag 360.

For example, in the case of FIG. 6A, when the distance measurement icon is selected, and then the first middle point D/327 and the second middle point E/328 are selected, like the first distance 331 shown in FIG. 6A, in the figure display area 330 of the geometry tag 320, a numerical value showing the distance between the first middle point D/327 and the second middle point E/328 is displayed near a line segment DE in order to indicate its correspondence to the line segment DE. At the time, the characteristic quantity (distance) tag 360 is also displayed. The characteristic quantity (distance) tag 360 is associated with the geometry tag 320 by a string 364. The characteristic quantity (distance) tag 360 includes a first tag 361 corresponding to the first distance 331. The terminal 20 may update the displayed contents such that the color of a tab 361T of the first tag 361 becomes the same as the color of the line segment DE. Thanks to this visual effect, mutual correspondence between the tab 361T of the first tag 361 and the line segment DE can be easily recognized at a glance.

When the second point B/322 and the third point C/323 are selected, like the second distance 332 shown in FIG. 6A, in the figure display area 330 of the geometry tag 320, a numerical value showing the distance between the second point B/322 and the third point C/323 is displayed near the side BC/329 in order to indicate its correspondence to the side BC/329. The characteristic quantity (distance) tag 360 includes a second tag 362 corresponding to the second distance 332. The terminal 20 may update the displayed contents such that the color of a tab 362T of the second tag 362 becomes the same as the color of the side BC/329. Thanks to this visual effect, mutual correspondence between the tab 362T of the second tag 362 and the side BC/329 can be easily recognized at a glance. The characteristic quantity (distance) tag 360 has a status indicator 360C which indicates whether or not the characteristic quantity (distance) tag 360 is in the selected status.

In Step S306 and Step S307, the distance(s) is measured as an example. Actions, if not the same, similar to the above apply to a case where the length of a line segment (s) is measured, a case where the interior angle or exterior angle is measured, a case where the area is measured, a case where the circumference or perimeter is measured, a case where the direction or slope of a line(s) is measured, and so forth. Each of the first tag 361 and the second tag 362 shown in FIG. 6A is a distance tag showing a distance as the characteristic quantity. Like the characteristic quantity (distance) tag 360, tags showing the same type of characteristic quantity are collectively displayed. For each type of characteristic quantity, a characteristic quantity tag which collectively displays two or more tags showing the same type of characteristic quantity, such as length of a line segment(s), interior angle or exterior angle, area, circumference or perimeter, or direction or slope of a line(s), may be displayed.

In Step S308, the terminal 20 determines whether or not another measurement icon has been selected. When the terminal determines that another measurement icon has not been selected, the figure-related process proceeds to Step S310. On the other hand, when the terminal 20 determines that another measurement icon has been selected, the figure-related process proceeds to Step S309. In Step S309, the terminal 20 obtains necessary information and executes a necessary arithmetic operation(s) in accordance with the selected icon, and displays an arithmetic result(s). The figure-related process then proceeds to Step S310.

In Step S310, the terminal 20 determines whether or not an arithmetic tag icon 359 has been selected. The arithmetic tag icon 359 is displayed in the display area 352 when the "Measurement" icon 357 is selected. When the terminal 20 determines that the arithmetic tag icon 359 has not been selected, the figure-related process proceeds to Step S312. On the other hand, when the terminal 20 determines that the arithmetic tag icon 359 has been selected, the figure-related process proceeds to Step S311.

In Step S311, the terminal 20 performs the expression input process. The expression input process is the process described above with reference to FIG. 3. Hereinafter, the expression input process in the case of FIG. 6B will be described. FIG. 6B shows an arithmetic tag 370 which is displayed when the arithmetic tag icon 359 is selected. The arithmetic tag 370 is associated with the geometry tag 320 by a string 374. The arithmetic tag 370 has a status indicator 370C which indicates whether or not the arithmetic tag 370 is in the selected status.

In the case of FIG. 6B, the selected arithmetic tag icon 359 is associated with the geometry tag 320 that includes the geometric figure (triangle ABC/324), which is a figure, so that the geometry tag 320 is the first display region. The characteristic quantity (distance) tag 360 showing value(s) associated with the geometry tag 320, which is the first display region, is the second display region. In the characteristic quantity (distance) tag 360, (i) a letter "a" representing the length of the line segment DE of the geometry tag 320 and its value "6.02" and (ii) a letter "b" representing the length of the line segment BC of the geometry tag 320 and its value "12.04" are displayed. The arithmetic tag 370 showing a calculation expression associated with the geometry tag 320, which is the first display region, is the third display region.

In Step S201, the terminal 20 displays the arithmetic tag 370 as the third display region on a screen 312. In Step S202, the terminal 20 determines whether or not the second display region is present. Because the characteristic quantity (distance) tag 360, which is the second display region, is present, the terminal 20 proceeds to Step S203. In Step S203, because the number of values displayed in the first tag 361 of the characteristic quantity (distance) tag 360 is one, the terminal 20 displays a first substitution icon 367 in the first tag 361, and similarly, because the number of values displayed in the second tag 362 is one, the terminal 20 displays a second substitution icon 368 in the second tag 362.

When, as shown in FIG. 6B, a fraction is selected with the software keyboard 240, and the first substitution icon 367 is selected in a state in which a cursor is on the numerator, the expression input process proceeds from Step S206 to Step S207, and "a" is inserted into the expression input area 371. Also, when the second substitution icon 368 is selected in a state in which the cursor is on the denominator, the expression input process proceeds from Step S206 to Step S207, and "b" is inserted into the expression input area 371. The user may input the "a/b" by direct inputs using the software keyboard 240, namely, by selecting/touching "a", "/", and "b" in this order, without using the substitution icons.

When a substitution icon or the like included in the characteristic quantity (distance) tag 360 is selected, between the line segment DE and the line segment BC in the figure ABC/324 displayed in the geometry tag 320 associated with the characteristic quantity (distance) tag 360, points, a line, a plane and/or the like of a line segment corresponding to the selected substitution icon or the like are visually changed. This makes it easy to recognize, at a glance, to which part in the figure ABC/324 the substitution icon or the like with a numerical value or a variable input corresponds. In the above case, after a substitution icon or the like is selected, its corresponding part in the figure display area 330 of the geometry tag 320 may be made to blink at least for a predetermined period of time, may be made to change its color (dark/light) between before and after the selection operation, and/or may be made to change its thickness or size between before and after the selection operation. The same distinguishable display styles may be employed in Step S205 for the case of the direct input(s).

For example, as shown in FIG. 6B, when the second substitution icon 368 of the characteristic quantity (distance) tag 360 is pointed with the graphic cursor 402 and thereby selected, the second substitution icon 368 changes its color, and also the side BC/329 blinks.

Referring back to FIG. 5B, after the expression input process, the figure-related process proceeds to Step S312. In Step S312, the terminal 20 determines whether or not an arithmetic execution instruction has been input. When the terminal 20 determines that no arithmetic execution instruction has been input, the figure-related process proceeds to Step S316. On the other hand, when the terminal 20 determines that an arithmetic execution instruction has been input, the figure-related process proceeds to Step S313.

In Step S313, the terminal 20 sends information on the expression input in the expression input area 371 and necessary values to the server 10. In the case of FIG. 6B, an expression "a/b" is input in the expression input area 371, and a and b are 6.02 and 12.04, respectively, as displayed in the characteristic quantity (distance) tag 360. The terminal 20 sends the expression and the values to the server 10.

In Step S314, the server 10 receives the expression information and so forth, executes an arithmetic operation of the obtained expression, and sends arithmetic result data to the terminal 20. In Step S315, the terminal 20 receives the arithmetic result data, and displays an arithmetic result in a solution display area 372 on the basis of the received arithmetic result data. In the case of FIG. 6B, when the "EXE" key 241 of the software keyboard 240 is selected, the figure-related process proceeds from Step S312 to Step S313. In Step S314, the server 10 executes the arithmetic operation of the expression "a/b", namely, "6.02/12.04", and obtains "1/2" as its solution. In Step S315, the terminal 20 displays the solution "1/2" in the solution display area 372.

Consequently, the user grasps that the length of the line segment DE, which connects the middle points D and E, to the length of the side BC is 1/2. The terminal 20 then proceeds to Step S316.

In Step S316, the terminal 20 determines whether or not to end the figure-related process. When the terminal 20 determines not to end the figure-related process, the figure-related process returns to Step S301. On the other hand, when the terminal 20 determines to end the figure-related process, the figure-related process ends.

As described above, the user can use the substitution icons in the expression input process for the geometry tag 320. As with the candidate icons, using the substitution icons makes input of expressions easy, and also prevents incorrect input thereof.

In the above embodiment, the system 1 operates with the server 10 and the terminal 20 which connect with one another via the network 50. Division of the above actions/steps between the server 10 and the terminal 20 is not limited to the one described above, and can be changed appropriately. Further, the application software for the above functions may be installed in the terminal 20, such as a PC or a tablet information processing apparatus, and the terminal 20 may perform the functions not via the sever 10 but by itself. That is, each element of each function described above is realized by any of computers, which include the server 10 and the terminal 20.

In the above embodiment, applications for mathematics education are cited as examples. However, this is not intended to limit the present invention. The above technology is applicable to applications for various types of education. Further, the technology is applicable to various applications not only for education but also, for example, for analysis, in particular, applications in the fields of mathematics, physics, chemistry, other science, and engineering.

The present invention is not limited to the above embodiment(s), and can be variously modified in the practical phase without departing from the scope of the present invention. Further, the embodiments may be appropriately combined and implemented. In this case, combined effects are obtained. Still further, the embodiments include various inventions which can be extracted by, from disclosed elements, selecting some of the disclosed elements and combining the same. For example, even if some elements are removed from all the elements disclosed in the embodiment(s), a configuration made by removing the elements can be extracted as an invention as far as it can achieve at least one object and obtain at least one effect.

The invention claimed is:

1. An information processing method comprising:
   displaying a graph on a display screen of a display,
   receiving a user operation of specifying at least part of the displayed graph by directly selecting the at least part of the graph where the at least part of the graph is displayed,
   in response to the user operation of specifying the at least part of the displayed graph by directly selecting the at least part of the graph where the at least part of the graph is displayed, displaying a characteristic quantity tag corresponding to a numerical value which is associated with the at least part of the graph on the display screen,
   receiving a user operation of selecting the characteristic quantity tag,
   in response to the user operation of selecting the characteristic quantity tag, displaying, as at least part of a second mathematical expression to execute calculation using the numerical value which is associated with the characteristic quantity tag selected, the numerical value or a variable indicating the numerical value which is associated with the characteristic quantity tag on the display screen.

2. The information processing method according to claim 1, further comprising:
   in response to the user operation of specifying the at least part of the graph, displaying a label which is associated with the at least part of the graph on the display screen,
   receiving a user operation selecting the label, and
   in response to the user operation of selecting the label, displaying the characteristic quantity tag on the display screen.

3. The information processing method according to claim 1, wherein:
   the displaying the graph comprises displaying the graph in a first display region on the display screen,
   the displaying the characteristic quantity tag comprises displaying the characteristic quantity tag in a second display region which is independent of the first display region on the display screen, and
   the method further comprises displaying a label which is associated with the at least part of the graph in the first display region, so that a correspondence relationship between the at least part of the graph displayed in the first display region and the characteristic quantity tag displayed in the second display region is visually recognizable.

4. The information processing method according to claim 3, further comprising:
   in response to the user operation of selecting the characteristic quantity tag, which is displayed in the second display region, distinguishably displaying at least any of the corresponding label displayed in the first display region and the at least part of the graph indicated by the corresponding label.

5. The information processing method according to claim 1, wherein:
   the displaying the graph comprises displaying the graph in a first display region on the display screen,
   the displaying the characteristic quantity tag comprises displaying the characteristic quantity tag in a second display region which is independent of the first display region on the display screen, and
   the displaying the numerical value or the variable indicating the numerical value comprises displaying the second mathematical expression in a third display region which is independent of the first display region and the second display region on the display screen.

6. A non-transitory computer readable storage medium having stored thereon a program that is executable by a computer to control the computer to perform functions comprising:
   displaying a graph on a display screen of a display,
   in response to a user operation of specifying at least part of the displayed graph by directly selecting the at least part of the graph where the at least part of the graph is displayed, displaying a characteristic quantity tag corresponding to a numerical value which is associated with the at least part of the graph on the display screen,
   in response to a user operation of selecting the characteristic quantity tag, displaying, as at least part of a second mathematical expression to execute calculation using the numerical value which is associated with the characteristic quantity tag selected, the numerical value or a variable indicating the numerical value which is associated with the characteristic quantity tag on the display screen.

7. The non-transitory computer readable storage medium according to claim 6, wherein the program is executable by the computer to control the computer to perform further functions comprising:
   in response to the user operation of specifying the at least part of the graph, displaying a label which is associated with the at least part of the graph on the display screen, and
   in response to a user operation of selecting the label, displaying the icon characteristic quantity tag on the display screen.

8. The non-transitory computer readable storage medium according to claim 6, wherein:
   the displaying the graph comprises displaying the graph in a first display region on the display screen,
   the displaying the characteristic quantity tag comprises displaying the characteristic quantity tag in a second display region which is independent of the first display region on the display screen, and
   the program is executable by the computer to control the computer to perform further functions comprising displaying a label which is associated with the at least part of the graph in the first display region, so that a correspondence relationship between the at least part of the graph displayed in the first display region and the characteristic quantity tag displayed in the second display region is visually recognizable.

9. The non-transitory computer readable storage medium according to claim 8, wherein the program is executable by the computer to control the computer to perform further functions comprising:
   in response to the user operation of selecting the characteristic quantity tag, which is displayed in the second display region, distinguishably displaying at least any of the corresponding label displayed in the first display region and the at least part of the graph indicated by the corresponding label.

10. The non-transitory computer readable storage medium according to claim 6, wherein:
   the displaying the graph comprises displaying the graph in a first display region on the display screen,
   the displaying the characteristic quantity tag comprises displaying the characteristic quantity tag in a second display region which is independent of the first display region on the display screen, and
   the displaying the numerical value or the variable indicating the numerical value comprises displaying the second mathematical expression in a third display region which is independent of the first display region and the second display region on the display screen.

11. The information processing method according to claim 1, wherein:
   the characteristic quantity tag includes at least one candidate icon or substitution icon corresponding to the numerical value, and
   the user operation of selecting the characteristic quantity tag is a user operation of selecting the at least one candidate icon or substitution icon.

12. The information processing method according to claim 1, wherein:
   the numerical value is a coordinate value of a coordinate of the at least part of the graph specified by the user operation of specifying the at least part of the displayed graph,
   the characteristic quantity tag includes at least one candidate icon corresponding to the variable indicating the coordinate value, and
   the user operation of selecting the characteristic quantity tag is a user operation of selecting the at least one candidate icon.

13. The information processing method according to claim 1, wherein the displaying the graph comprises displaying the graph on the display screen of the display based on first mathematical expression data on a first mathematical expression input by a user operation.

14. The information processing method according to claim 5,
   wherein the numerical value or variable comprises one or more numerical values or variables, and
   wherein the method further comprises:
   in a second mathematical expression input process of inputting the second mathematical expression:
      determining that the second display region is displayed on the display screen, and
      in response to determining that the second display region is displayed, displaying one or more candidate icons or one or more substitution icons in the second display region for a number of values corresponding to a number of the one or more numerical values or variables displayed in the second display region.

15. The information processing method according to claim 1,
wherein:
the user operation of selecting the characteristic quantity tag is a user operation of directly selecting the displayed characteristic quantity tag at its displayed position on the display screen, and
the method further comprises:
in response to the user operation of directly selecting the displayed characteristic quantity tag at its displayed position on the display screen, performing an insertion process to insert the numerical value associated with the characteristic quantity tag into the second mathematical expression, which is displayed on the display screen, to execute calculation using the numerical value, and displaying, in the second mathematical expression, on the display screen, the numerical value inserted into the second mathematical expression or the variable indicating the numerical value inserted into the second mathematical expression by the insertion process.

16. The non-transitory computer readable storage medium according to claim 6, wherein:
the characteristic quantity tag includes at least one candidate icon or substitution icon corresponding to the numerical value, and
the user operation of selecting the characteristic quantity tag is a user operation of selecting the at least one candidate icon or substitution icon.

17. The non-transitory computer readable storage medium according to claim 6, wherein:
the numerical value is a coordinate value of a coordinate of the at least part of the graph specified by the user operation of specifying the at least part of the displayed graph,
the characteristic quantity tag includes at least one candidate icon corresponding to the variable indicating the coordinate value, and
the user operation of selecting the characteristic quantity tag is a user operation of selecting the at least one candidate icon.

18. The non-transitory computer readable storage medium according to claim 6, wherein the displaying the graph comprises displaying the graph on the display screen of the display based on first mathematical expression data on a first mathematical expression input by a user operation.

19. The non-transitory computer readable storage medium according to claim 10,
wherein the numerical value or variable comprises one or more numerical values or variables, and
wherein the program is executable by the computer to control the computer to perform further functions comprising:
in a second mathematical expression input process of inputting the second mathematical expression:
determining that the second display region is displayed on the display screen, and
in response to determining that the second display region is displayed, displaying one or more candidate icons or one or more substitution icons in the second display region for a number of values corresponding to a number of the one or more numerical values or variables displayed in the second display region.

20. The non-transitory computer readable storage medium according to claim 6, wherein:
the user operation of selecting the characteristic quantity tag is a user operation of directly selecting the displayed characteristic quantity tag at its displayed position on the display screen, and
wherein the program is executable by the computer to control the computer to perform further functions comprising:
in response to the user operation of directly selecting the displayed characteristic quantity tag at its displayed position on the display screen, performing an insertion process to insert the numerical value associated with the characteristic quantity tag into the second mathematical expression, which is displayed on the display screen, to execute calculation using the numerical value, and displaying, in the second mathematical expression, on the display screen, the numerical value inserted into the second mathematical expression or the variable indicating the numerical value inserted into the second mathematical expression by the insertion process.

\* \* \* \* \*